US009832449B2

(12) United States Patent
Cole et al.

(10) Patent No.: US 9,832,449 B2
(45) Date of Patent: Nov. 28, 2017

(54) METHODS AND APPARATUS FOR CONTROLLING A VIEWING POSITION

(71) Applicant: NextVR Inc., Laguna Beach, CA (US)

(72) Inventors: David Cole, Laguna Beach, CA (US); Alan McKay Moss, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 0 days.

(21) Appl. No.: 15/009,531

(22) Filed: Jan. 28, 2016

(65) Prior Publication Data

US 2016/0227190 A1 Aug. 4, 2016

Related U.S. Application Data

(60) Provisional application No. 62/110,355, filed on Jan. 30, 2015.

(51) Int. Cl.
*H04N 13/00* (2006.01)
*H04N 13/04* (2006.01)
(Continued)

(52) U.S. Cl.
CPC ......... *H04N 13/0055* (2013.01); *G06F 1/163* (2013.01); *G06F 1/1626* (2013.01);
(Continued)

(58) Field of Classification Search
CPC .......... H04N 13/00; H04N 13/02; H04N 9/80; H04N 5/77
(Continued)

(56) References Cited

U.S. PATENT DOCUMENTS 5,714,997 A 2/1998 Anderson
2001/0033332 A1* 10/2001 Kato ................ G08B 13/19645
348/211.99
(Continued)

OTHER PUBLICATIONS

Notification of Transmittal of the International Search Report and the Written Opinion of the International Searching Authority, International Search Report and Written Opinion of the International Searching Authority from PCT/US2016/015561 dated Apr. 14, 2016 1-7 pages.

*Primary Examiner* — Daquan Zhao
(74) *Attorney, Agent, or Firm* — Straub & Straub; Michael P. Straub; Stephen T. Straub

(57) ABSTRACT

Methods and apparatus for allowing a user to switch viewing positions and/or perspective while viewing an environment, e.g., as part of a 3D playback/viewing experience, are described. In various embodiments images of the environment are captured using cameras placed at multiple camera positions. During viewing a user can select which camera position he/she would like to experience the environment from. While experiencing the environment from the perspective of a first camera position the user may switch from the first to a second camera position by looking at the second position. A visual indication is provided to the user to indicate that the user can select the other camera position as his/her viewing position. If a user input indicates a desired viewing position change, a switch to the alternate viewing position is made and the user is presented with images captured from the perspective of the user selected alternative viewing position.

21 Claims, 13 Drawing Sheets

(51) Int. Cl.
    *H04N 9/80*          (2006.01)
    *H04N 13/02*        (2006.01)
    *G06F 3/01*           (2006.01)
    *G06F 1/16*           (2006.01)
    *H04N 5/77*           (2006.01)
    *G02B 27/01*         (2006.01)

(52) U.S. Cl.
    CPC .............. *G06F 3/011* (2013.01); *G06F 3/012* (2013.01); *H04N 13/0044* (2013.01); *H04N 13/0242* (2013.01); *H04N 13/047* (2013.01); *H04N 13/0497* (2013.01); *G02B 27/017* (2013.01); *G02B 2027/0138* (2013.01); *G02B 2027/0187* (2013.01)

(58) Field of Classification Search
    USPC ....................... 386/248, 239, 224; 348/42, 47
    See application file for complete search history.

(56) References Cited

U.S. PATENT DOCUMENTS

| | | | |
|---|---|---|---|
| 2007/0022455 A1* | 1/2007 | Endou | H04N 7/181 725/105 |
| 2012/0236107 A1 | 9/2012 | Rosenberg | |
| 2012/0259638 A1* | 10/2012 | Kalinli | G10L 15/25 704/270 |
| 2013/0307771 A1 | 11/2013 | Parker et al. | |
| 2015/0138079 A1* | 5/2015 | Lannsjo | G06F 3/013 345/156 |

* cited by examiner

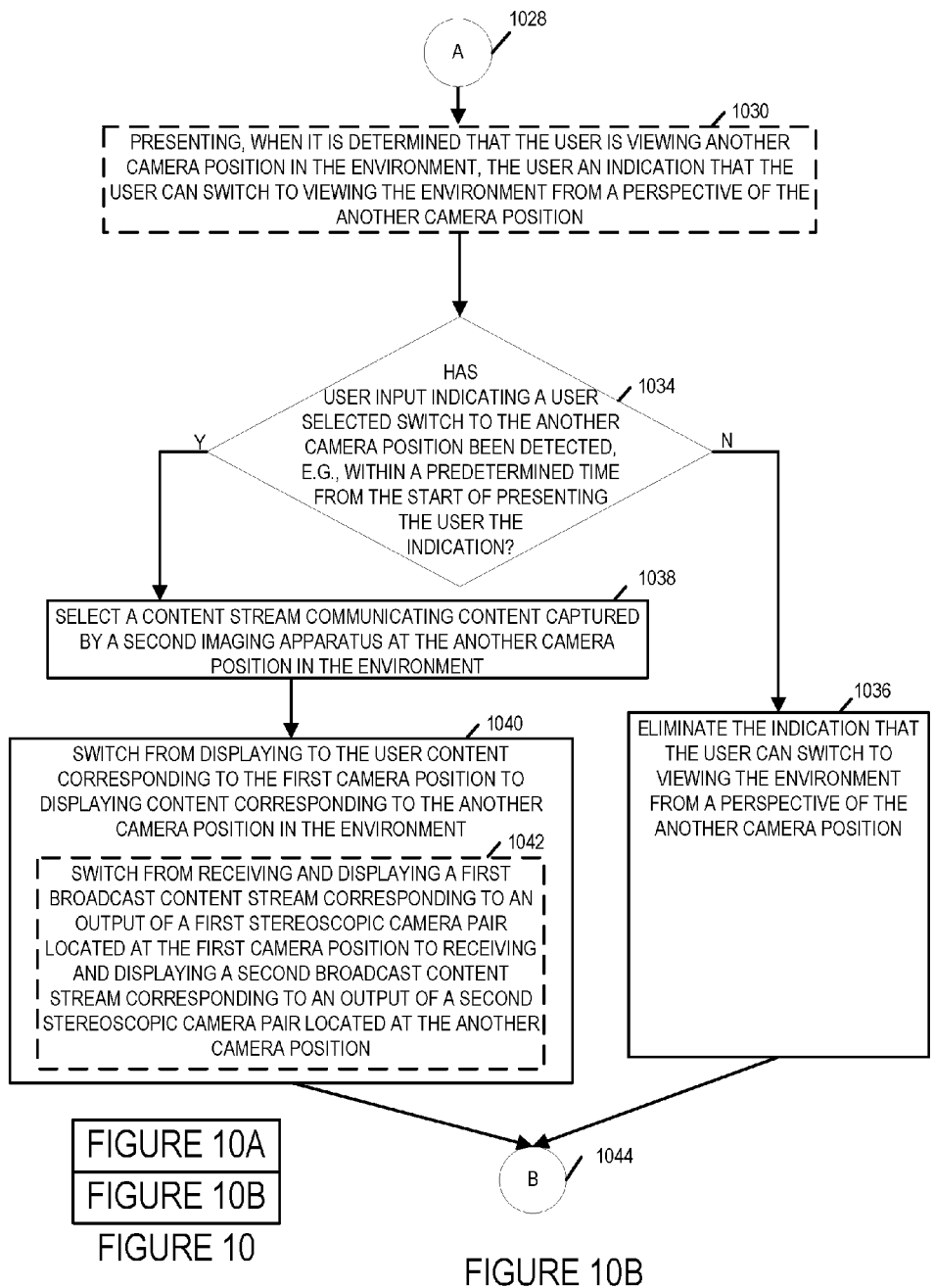

METHODS AND APPARATUS FOR CONTROLLING A VIEWING POSITION

RELATED APPLICATIONS

The present application claims the benefit of U.S. Provisional Patent Application Ser. No. 62/110,355 filed Jan. 30, 2015 which is hereby expressly incorporated by reference in its entirety.

FIELD

The present application relates to playback methods and apparatus and, more particularly, to methods and apparatus relating to controlling presentation of content from a user desired perspective and/or camera position.

BACKGROUND

Many times during events taking place at environments such as sports stadiums, theaters, concert halls, the events are captured by a number of cameras placed at different locations to capture a different perspective of the event that is taking place. Some times the cameras are placed in the vicinity of the actual seating areas for the audience so that the content presented to the users is captured from the perspective of audience actually experiencing the event. For example during a sporting event such as a soccer game in a sports arena/stadium, multiple cameras are deployed at different locations, for example with one or more cameras close to the mid field position corresponding to the halfway line in the center of the field, one or more cameras close to each corner of the field and one or more cameras near the end lines of the field corresponding to the two goal post. Each of the deployed cameras capture content from the perspective of its camera position.

While the content captured from the perspective of each of the deployed cameras at their different respective camera positions is available, the decision to choose which content feed is to be shown to a viewer watching the video content is made by the broadcaster and/or producer not the by viewer. A broadcaster and/or producer may decide to present the video content feed communicating content captured by a camera at mid field position even though an actual may viewer may want to view the game from the perspective of another camera position, for example from the perspective of the cameras near the end line of the field corresponding to a goal post. Thus the control as to which video content feed is presented to a viewer at a given time lies with the content provider/broadcaster irrespective of the viewer's desire.

In view of the above discussion, it should be appreciated that there is a need for methods and/or apparatus which would allow a viewer to choose a viewing position in an environment based on the viewer's desire at the given time thereby allowing the viewer to select the perspective from which the viewer would like to experience the environment, e.g., as part of a 3D playback and/or viewing experience.

SUMMARY

Methods and apparatus for allowing a user to switch viewing positions and/or perspective while viewing an environment, e.g., as part of a 3D playback and/or viewing experience, are described. In various embodiments multiple camera positions are used in the environment to capture stereoscopic image data, e.g., pairs of left and right eye views. During playback and/or viewing a user can select which camera position he/she would like to experience the environment from, that is, the user can choose a cameras position from the perspective of which the user views the captured content. At a given time one or more camera positions may be chosen for content presentation to the viewer. Thus, for example, a user may switch from a midfield position to an end field position. The user may do this by looking at another camera position when viewing the event/environment from a first camera position. A visual or other indication is provided to the user to indicate to the user that the user can select the other camera position as his/her viewing position if the user desires to do so. This may be done by changing the color of the camera position being viewed, e.g., to green or red, displaying a banner or other indicator to the user or providing some other indication such as a particular icon such as that of a camera at the alternative viewing location which the user can select. The system monitors for user input while the user is presented with the queue or other indicator that the alternative viewing position can be selected. If the user provides input, e.g., one or two taps on an input interface, e.g., a touch pad device, and/or via another user interface, indicating the user wants to switch to the viewing position he/she is looking at, a switch to the alternate viewing position is made and the user is presented with images captured from the perspective of the user selected alternative viewing position rather than the user's original viewing position. In some embodiments selection of more than one camera position is allowed and in such case the content may be presented on a display in multiple windows, e.g., side by side or in different corners, with each window displaying content from the perspective of a selected camera position.

As the result of a user selected switch between viewing positions the user experiences a teleport like affect and begins viewing the 3D environment from the newly selected position as if he/she had changed seats in the stadium or other environment thereby giving the user an experience as if the user is viewing the environment from the perspective of the newly selected camera position.

An exemplary method of presenting content corresponding to an environment, comprises: displaying to a user content corresponding to a first camera position in said environment; determining if the user is viewing another camera position in said environment; and monitoring, while said user is viewing said another camera position, to detect user input indicating a user selected switch to said another camera position.

Numerous variations on the above described methods and apparatus are possible. The methods and apparatus and various benefits are discussed further in the detailed description which follows.

BRIEF DESCRIPTION OF THE FIGURES

FIG. 10B is a second part of the flowchart illustrating the steps of the exemplary method of presenting content corresponding to an environment, with FIG. 10 comprising a combination of FIGS. 10A and 10B.

DETAILED DESCRIPTION

Figure 1:
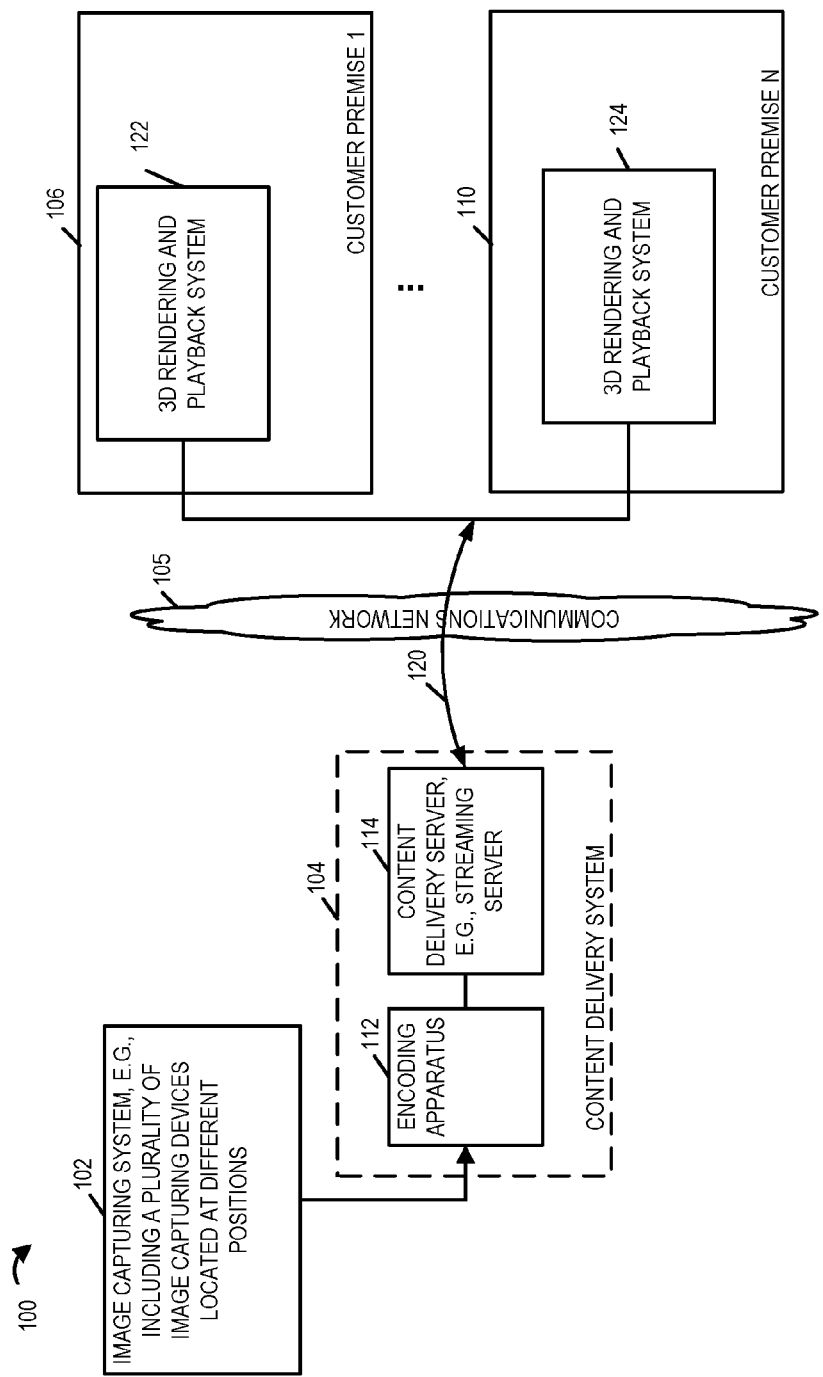
FIG. 1 illustrates an exemplary system implemented in accordance with some embodiments of the invention which can be used to capture and stream content for subsequent display by one or more users along with one or more synthesized portions of an environment.

FIG. 1 illustrates an exemplary system 100 implemented in accordance with some embodiments of the invention. The system 100 supports content delivery, e.g., imaging content delivery, to one or more customer devices, e.g., 3D capable playback devices located at customer premises. The system 100 includes the exemplary image capturing system 102, a content delivery system 104, a communications network 105, and a plurality of customer premises 106, . . . , 110. The image capturing system 102 supports capturing of stereoscopic imagery, e.g., using stereoscopic camera pairs, as well as capturing of normal non-stereoscopic imagery. The image capturing system 102 captures and processes imaging content in accordance with the features of the invention and may include a plurality of cameras/stereoscopic camera pairs corresponding to different camera positions in an environment for capturing images. The communications network 105 may be, e.g., a hybrid fiber-coaxial (HFC) network, satellite network, and/or internet.

The content delivery system 104 includes an encoding apparatus 112 and a content streaming device/server 114. The encoding apparatus 112 may, and in some embodiments does, include one or a plurality of encoders for encoding image data. The encoders may be used in parallel to encode different portions of a scene and/or to encode a given portion of a scene to generate encoded versions which have different data rates. Using multiple encoders in parallel can be particularly useful when real time or near real time streaming is to be supported. In some embodiments multiple different encoders are used in parallel to encode streams captured by different camera devices placed at different camera positions to capture images to allow the streaming device 114 to stream content corresponding to different camera positions based in a user selection.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as indicated in the figure by the link 120 traversing the communications network 105. While the encoding apparatus 112 and content delivery server are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include one or more devices/systems, e.g., devices capable of decoding, rendering, playback and display of the imaging content streamed by the content streaming device 114. Customer premise 1 106 includes a 3D rendering and playback system 122 while customer premise N 110 includes 3D rendering and playback system 124. In some embodiments the 3D rendering and playback systems 122, 124 are capable of rendering and displaying 3D imaging content in accordance with the invention.

In various embodiments the 3D rendering and playback systems 122, 124 may decode the imaging content received from the content delivery system 104, generate imaging content using the decoded content, and render the imaging content, e.g., 3D image content, on a display e.g., a stereoscopic display. In various embodiments the 3D rendering and playback systems 122, 124 are capable of performing additional processing, e.g., tracking user's head position and/or line of sight to determine which camera position the user wants to view the environment from and accordingly switch to displaying in accordance with the features of the invention.

Figure 2:
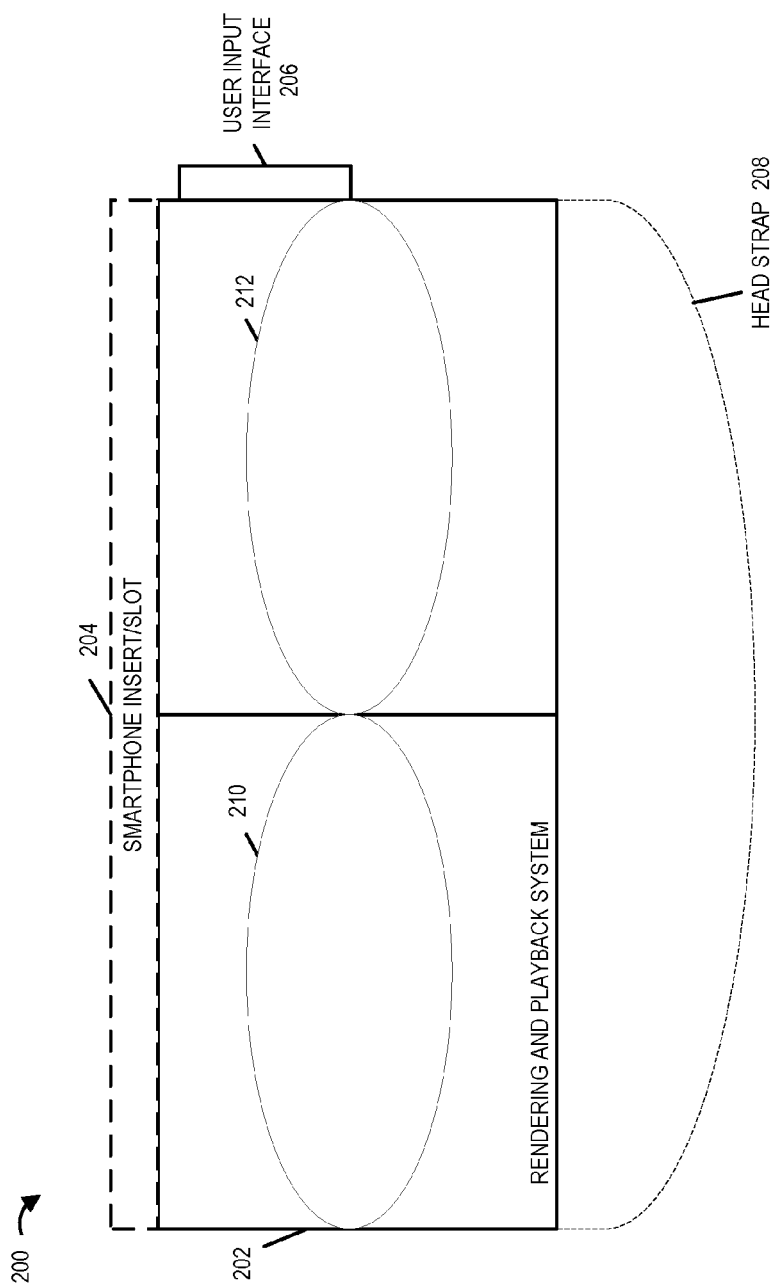
FIG. 2 illustrates an exemplary rendering and playback system, e.g., 3D rendering and playback system, implemented in accordance with one exemplary embodiment of the invention.

FIG. 2 illustrates an exemplary 3D rendering and playback system, implemented in accordance with one exemplary embodiment of the invention. The exemplary 3D rendering and playback system 200 may be used to display content captured by one or multiple cameras of the imaging system 102 and streamed by the content delivery system 104 to a user, e.g., a customer corresponding to customer premises 106, 110, in accordance with one exemplary embodiment. The exemplary 3D rendering and playback system 200 may be used as any of the 3D rendering and playback systems shown in FIG. 1. FIG. 2 shows a rear view of the 3D rendering and playback system 200 from the perspective of a user as if the user is going to wear, e.g., head mount, the rendering and playback system 200. Thus the illustrated view in FIG. 2 shows at least some elements that may be visible from the rear, e.g., looking into the rendering system 200 from the rear. The exemplary 3D rendering and playback system 200 includes a head mounted display assembly 202, a Smartphone insert/slot 204, a user input interface 206, a pair of lenses 210, 212 and a head strap 208.

Via the Smartphone insert/slot 204, a Smartphone can be inserted in the head mounted display assembly 202 of the system 200 thereby allowing the Smartphone display to become the display of the system 200. Once inserted in the slot 204 the Smartphone can communicate and exchange signaling with the head mounted display assembly 202. The Smartphone insert/slot 204 is shown as a dashed rectangular box to indicate the location of the slot 204 in the top portion of the rendering and playback system 200. The Smartphone serves as both the rendering and playback device, e.g., performing processing, rendering, playback and various operations for the system 200, and as the display device of the system 200 with the Smartphone screen serving as the display screen of the system 200. When mounted by a user, the user can view a displayed scene, e.g., a simulated 3D environment including content corresponding to a scene, through the lenses 210, 212. The simulated 3D environment displayed to the user allows for a real life 3D experience as if the user is actually present in the simulated environment.

Via the user input interface 206 user input is detected and actions are taken by the rendering and playback system 200. For example in some embodiments a user input via the interface 106 may indicate selection of a camera position selected by the user for viewing content in accordance with the features of the invention. In some embodiments the user input interface 106 includes a touchpad over which the user can move his fingers and a corresponding pointer, visible to the user on the display screen, moves along allowing the user to interact with objects displayed on the screen. In such embodiments the user may control the pointer to interact, e.g., select, move, delete etc., with icons and/or objects displayed on the screen. For example in some embodiments via the interface 206 the user may drag a pointer to a highlighted camera position of user's choosing and select the camera position, e.g., by tapping on the touchpad of interface 106, for viewing content corresponding to the selected camera position.

Figure 3:
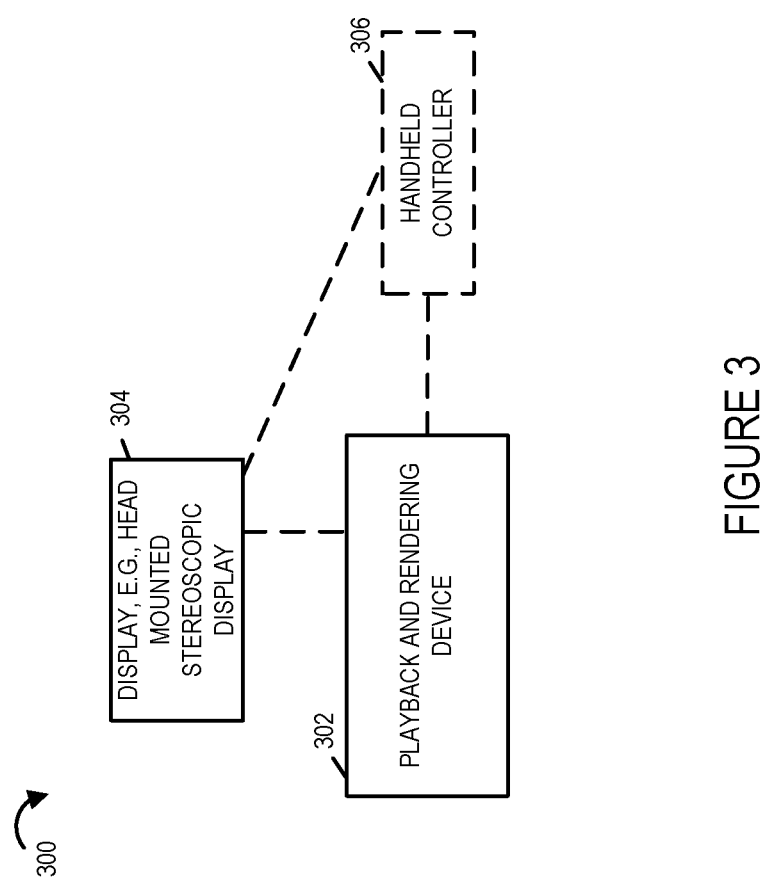
FIG. 3 illustrates another exemplary rendering and playback system implemented in accordance with some other embodiments of the invention.

FIG. 3 illustrates another rendering and playback system 300 implemented in accordance with some embodiments of the invention. The rendering and playback system 300 may be used as any of the exemplary 3D rendering and playback systems shown in FIG. 1. The rendering and playback system 300 maybe used to implement the methods of the present invention and present content to a user from the perspective of a user desired camera position. The exemplary 3D rendering and playback system 300 includes a playback and rendering device 302, e.g., a gaming console such as PS3, PS4 or other play station version, an Xbox version etc. In addition the rendering and playback system 300 further includes a stereoscopic display 304, and optionally a handheld controller 306. The elements 302, 304 and 306 of the system 300 may be wired and/or wirelessly connected (e.g., dashed lines indicating wired and/or wirelessly links). The display 304 in some embodiments is a head mounted stereoscopic display while in some other embodiments the display 304 may be another display device capable of displaying stereoscopic imaging content. In some embodiments the head mounted stereoscopic display 304 includes one or more sensors configured to track user's head movement and/or detect a change in user's head position. In some embodiments the playback and rendering device 202 includes one or more sensors, e.g., cameras, track user's head movement and/or detect a change in user's head position.

FIGS. 4-9 illustrate views of an exemplary environment, e.g., a stadium, theater, sports field, etc., with various seating areas and a performance area, with the position of various imaging apparatus (e.g., cameras) deployed in the environment being shown. FIGS. 4-9 also conceptually illustrate how viewing position can be switched/changed to correspond to various different camera positions where image capture devices are deployed in the environment.

Figure 4:
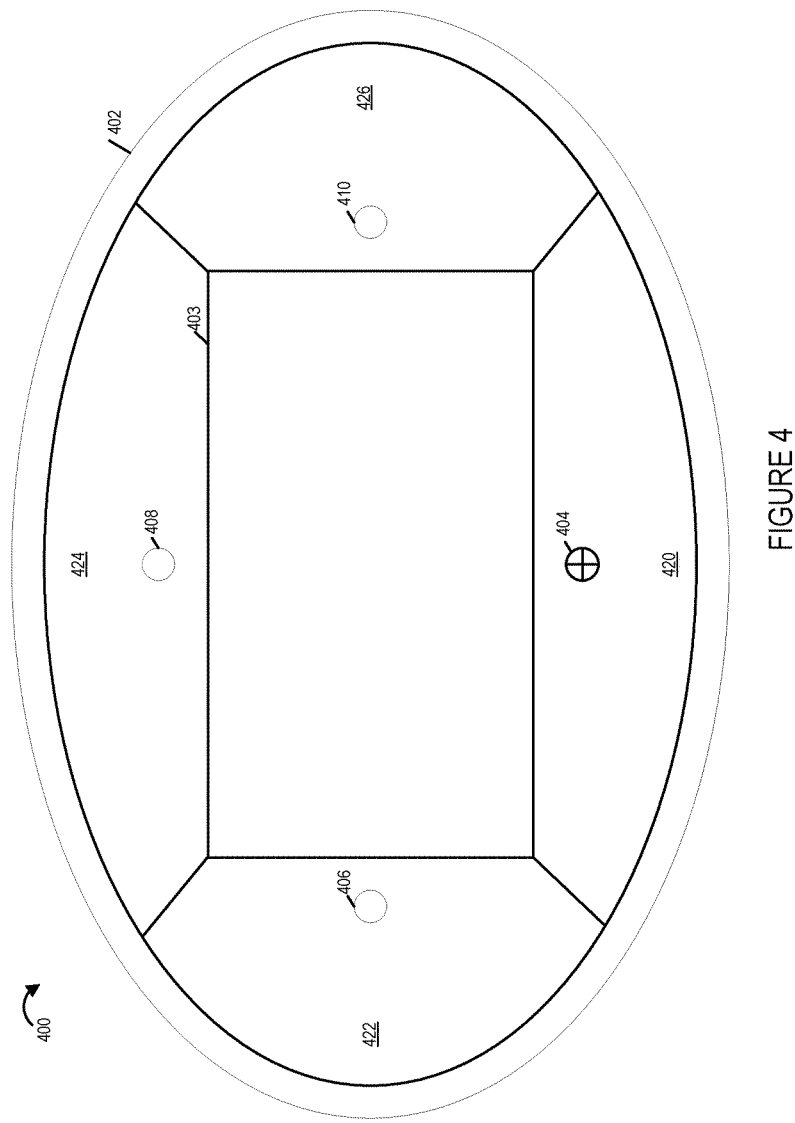
FIG. 4 is a drawing illustrating a view of an exemplary environment, e.g., a stadium, theater, sports field, etc., or a similar platform, where the methods and apparatus of the present invention may be used.

FIG. 4 is a drawing 400 illustrating a view of an exemplary environment 402, e.g., a stadium, theater, sports field, etc., or a similar platform, where the methods and apparatus of the present invention may be used. In some embodiments the environment 402 is a stadium or another sports area. In some embodiments the environment includes an audience seating area and a performance area, and the environment includes at least two camera positions corresponding to different audience seating positions.

In the illustrated example the exemplary environment 402 is e.g., a stadium with a plurality of different audience seating areas 420, 422, 424, 426 and a performance area 403. Shown further in the illustrated example of FIG. 4 are the various camera positions corresponding to imaging devices (e.g., cameras) deployed in the environment 402, with the camera positions/camera devices being represented by circles 404, 406, 408 and 410. Depending on the embodiment, each of the imaging devices at the camera positions 404, 406, 408 and 410 may include a single camera or a plurality of camera pairs, e.g., three camera pairs with each pair having two cameras to capture left and right eye images in some embodiments where stereoscopic imaging apparatus is used. While only four camera positions corresponding to the imaging devices are shown for simplicity it should be appreciated that more than four camera devices placed at additional location in the environment are possible in some embodiments. Each of the imaging devices located at the respective positions 404, 406, 408 and 410 in the environment 400 captures images of an event, e.g., game and/or other performance, from the perspective of its position in the environment 402. In various embodiments a user can choose to view content stream(s) including content captured by one or more camera devices at user selected camera positions and imaging content captured by the camera devices from the user selected camera positions is streamed to the user. Thus a user can choose to view content, captured by one or more of the imaging devices at positions 404, 406, 408 and 410. Normally a user chooses to view content stream captured by a single imaging device (which may however include more than one camera) corresponding to a single camera position. For example if the user chooses a first camera position 404, imaging content captured from the perspective of a camera device at position 404 is streamed to the user but if the if the user chooses camera position 406, imaging content captured from the perspective of camera at position 406 position is streamed. In the example of FIG. 4 the camera position 404 is shown as the selected viewing position as indicated by the cross on camera position 404. In some embodiments a default camera position is used to stream content initially when the system used for rendering and playback initializes and/or the user begins to view content. The user may change the default position to a different desired position. In some embodiment a graphical presentation of the environment including a graphical representation of the various available camera positions (such as the one illustrated in FIG. 4) is presented to the user to select an initial camera position for viewing content.

Figure 5:
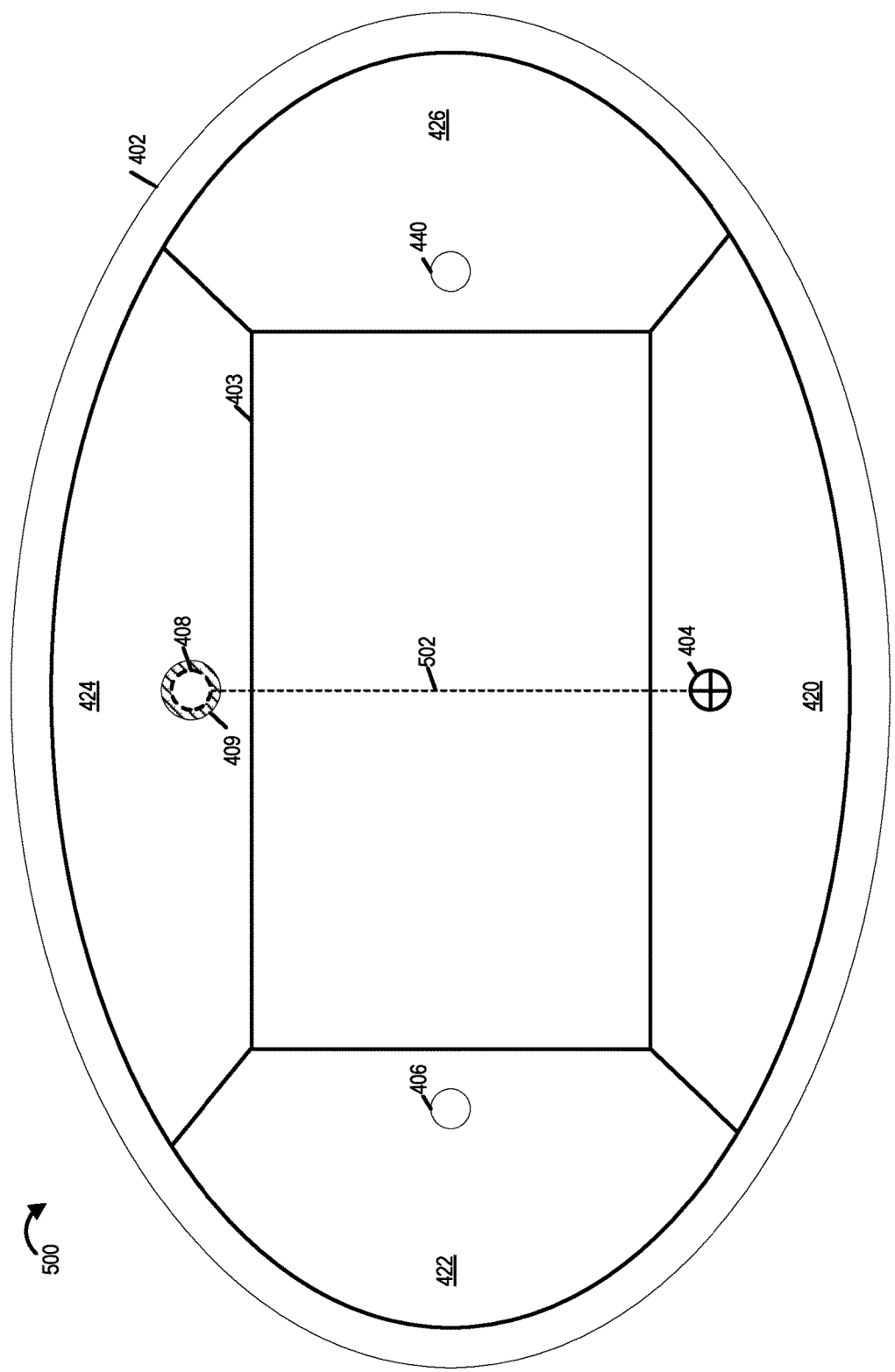
FIG. 5 is a drawing illustrating conceptually how a user selected switch from a current, e.g., first, camera position to another different, e.g., second, camera position, occurs in accordance with some embodiments.

FIG. 5 is a drawing 500 illustrating conceptually how a user selected switch from a current, e.g., first, camera position 404 to another different, e.g., second, camera position 408, e.g., occurs in accordance with some embodiments. In various embodiments the user is aware and/or is apprised about the various available camera positions from which the user may select a position as a current viewing position. The example of FIG. 5 depicts a scenario where the user wants to switch from the viewing position corresponding to camera position 404 (which was the currently selected/used position in FIG. 4 example) to a different viewing position corresponding to another camera position, e.g., second camera position 408. In accordance with the features of the present invention in some embodiments when the user wishes to change the viewing position, sometimes referred to as teleporting to the new camera position, the user simply starts looking at the desired known camera position, e.g., in a simulated environment being displayed to the user on a head mounted display or another display. Staring to look at another camera position may include the user rotation and/or tilting his/her current head orientation in order to change his/her line of sight so that the new desired camera position in the line of sight of the user. For example in the case illustrated in FIG. 5, prior to starting to view the second camera position 408 the user is looking at the performance area 403, which if viewed from the perspective of the user at the first camera position 404, is at a lower ground level than the a level to which camera position 404 corresponds. Thus when the user starts viewing the second camera position 408 the user will tilt his/her head up so that the user's line of sight changes and the user can look at the second camera position. Similarly looking at some other camera position, e.g., position 406, may need user's head rotation and/or tilt or both. As discussed later the change in head orientation relative to a reference or current orientation is monitored and used in determining whether the user is viewing another different camera position in the environment.

FIG. 5 example illustrates how a visual representation/indication 409 is displayed around the new camera position 408 where the user has been determined to be looking/viewing. The visual representation/indication 409 is displayed to the user, while the user is watching content in the simulated environment being presented to the user, to indicate that the user can switch the current viewing position to the position indicated by visual indication 409. As discussed below with regard to FIG. 6 in some embodiments, in addition to the indication 409, a prompt or message box may also be displayed to the user to present an option to switch viewing position.

Figure 6:
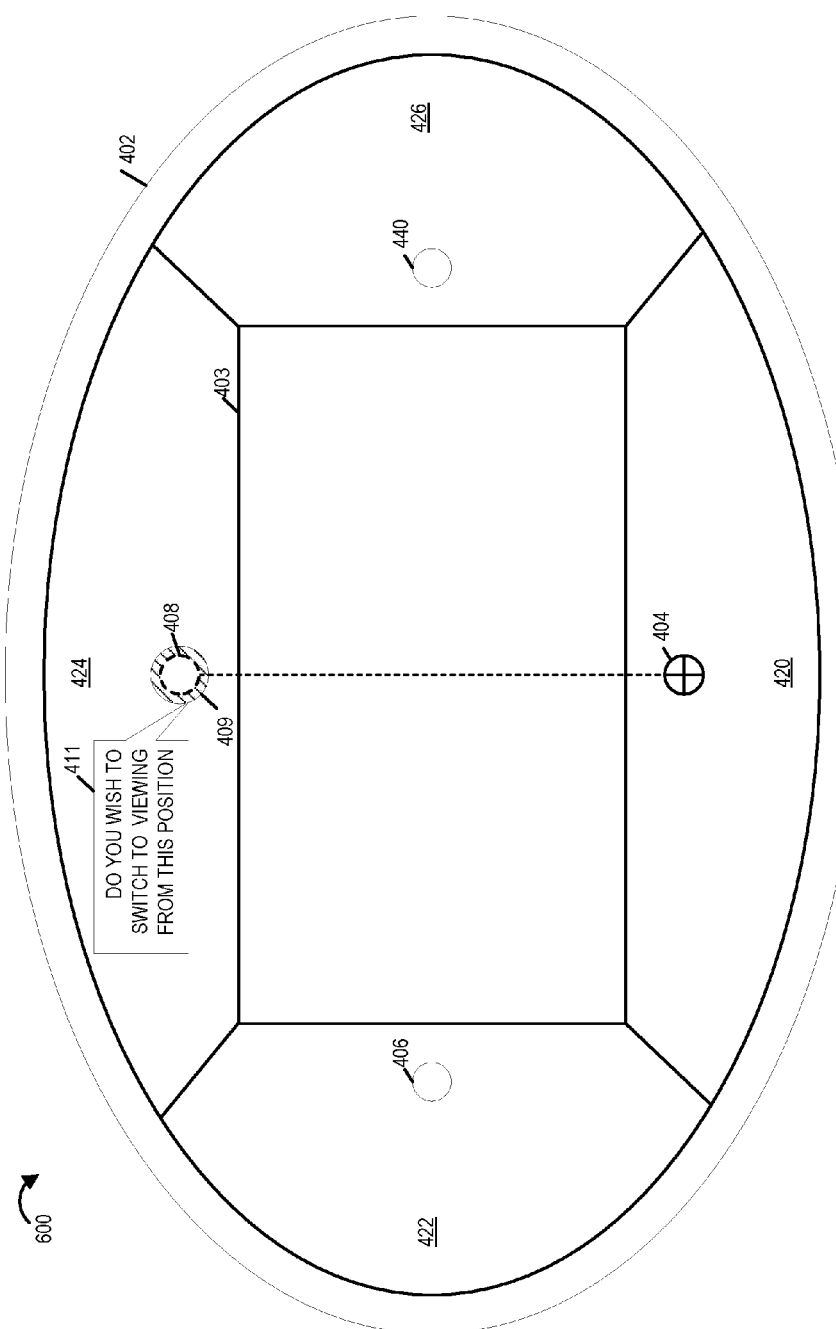
FIG. 6 is a drawing showing an indication, e.g., a visual indication, presented to the user providing an indication to the user indicating that the user can switch viewing position from a currently selected camera position to another camera position indicated by the visual indication, in accordance with some embodiments.

FIG. 6 is a drawing 600 showing a visual indication, e.g., in the form of a prompt or message box 411, that is presented to the user in some embodiments providing an indication to the user indicating that the user can switch viewing position from a currently selected position (e.g., camera position 404) to the indicated position, e.g., camera position 408. In various embodiments the prompt or message box 411 is presented to be user subsequent to determining that the user is viewing another camera position, e.g., the indicated camera position, in the environment 400. In some embodiments the visual indication includes text in the area of the another camera position that the user is viewing putting the user on notice of the potential to switch to viewing content from the perspective of the another camera position. In response to the indication 409 and/or the displayed prompt or message box 411 in some embodiments the user indicates selection of the new camera position via a user interface on a rendering and playback device. Following the selection of the new camera position the user is provided content from the perspective of the newly selected camera position.

Figure 7:
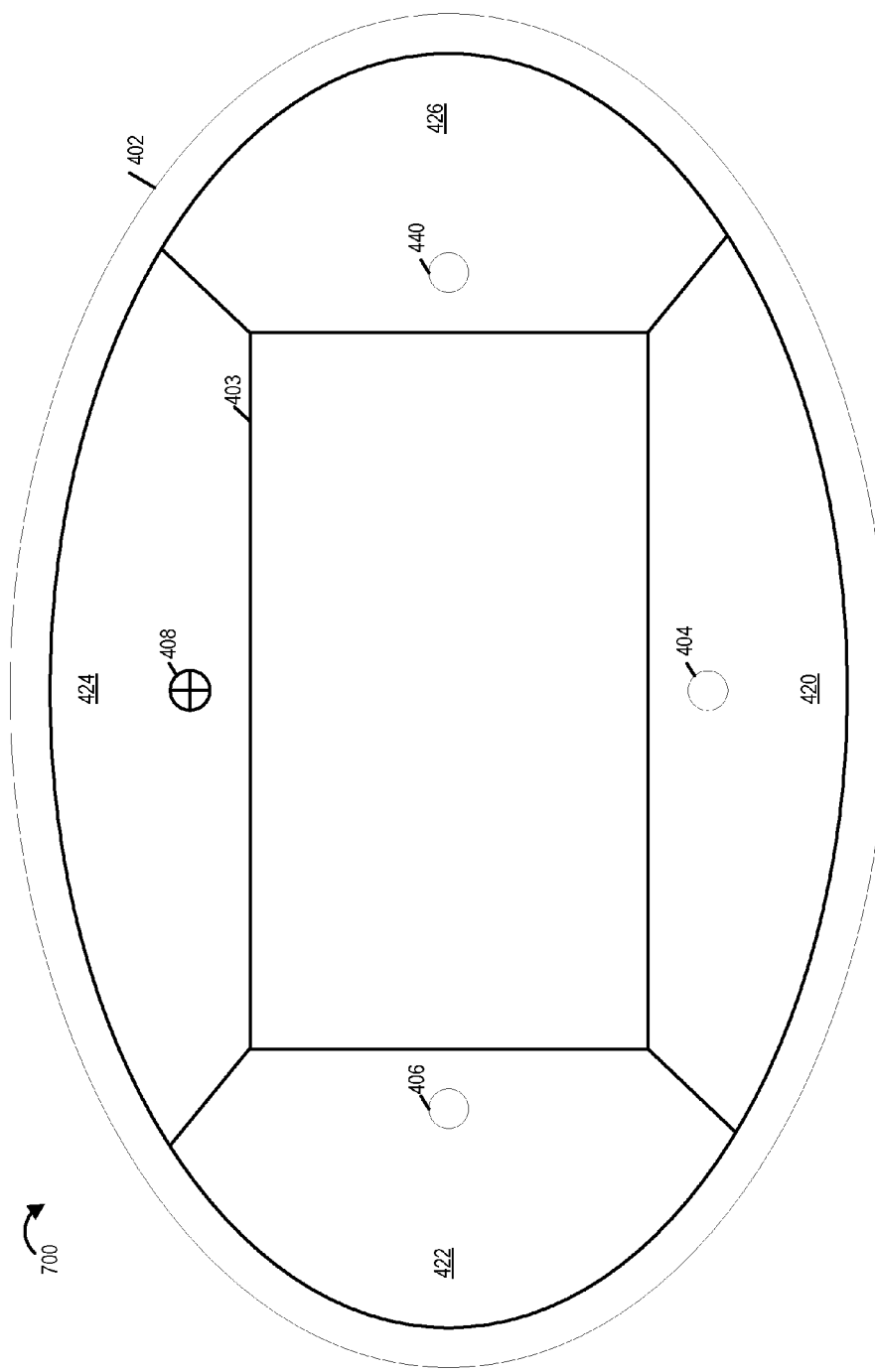
FIG. 7 is a drawing illustrating the exemplary environment at a time following user selected switch from the first camera position to a second camera position, with the new camera position being shown as the currently selected viewing position as indicated by the cross in the circle corresponding to the camera position to which the switch has been made.

FIG. 7 is a drawing 700 illustrating the exemplary environment 402 at a time following user selected switch from the first camera position 404 to the second camera position 408 with the new camera position being shown as the newly selected current viewing position as indicated by the cross in the circle corresponding to camera position 408.

Figure 8:
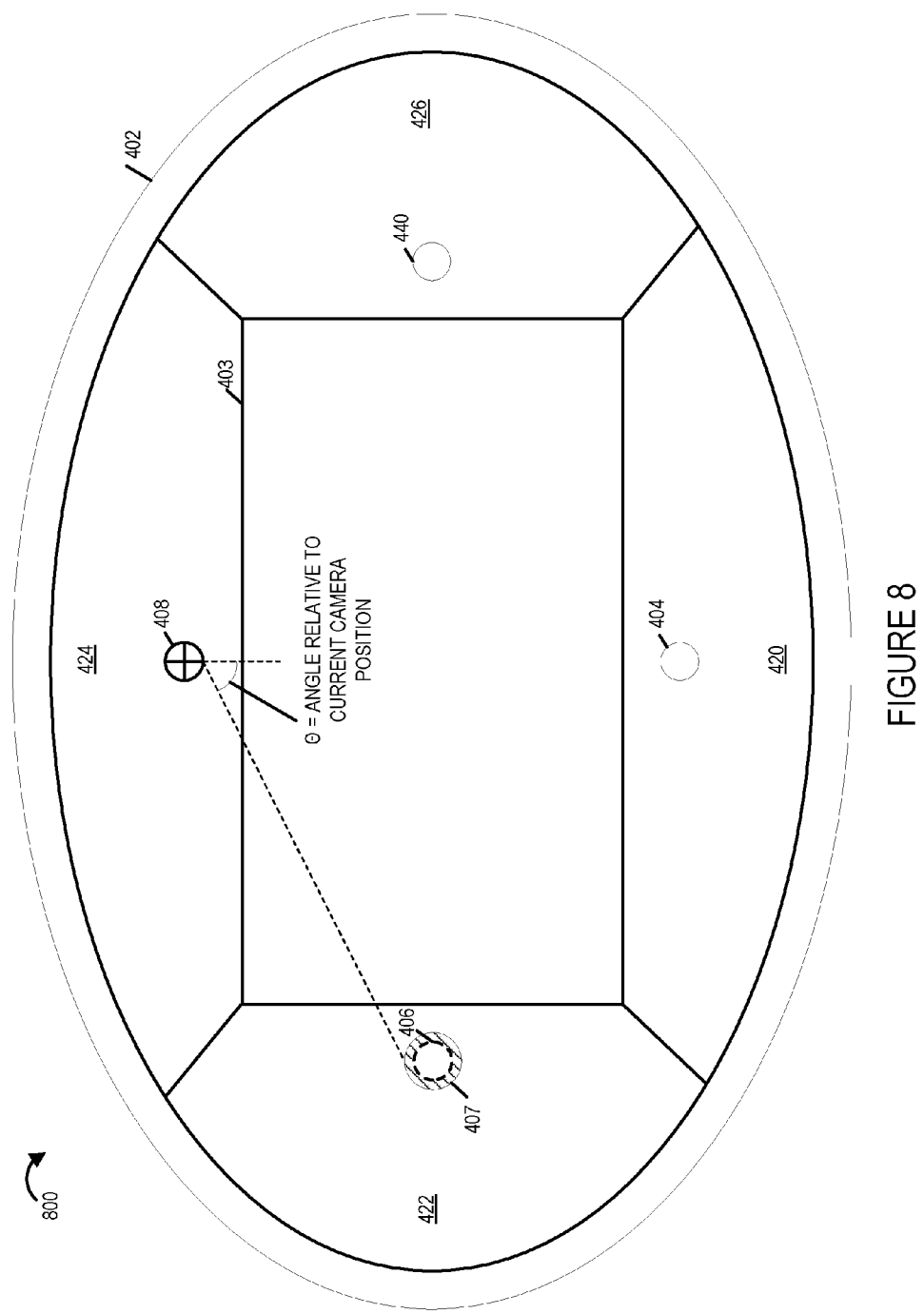
FIG. 8 is a drawing conceptually illustrating switching from the newly selected viewing position of FIG. 7 to yet another different camera position in accordance with some embodiments.

FIG. 8 is a drawing 800 conceptually illustrating switching from the newly selected viewing position (e.g., corresponding to camera position 408) to yet another different camera position in accordance with some embodiments. The example of FIG. 8 depicts a scenario where the user wants to switch from the viewing position corresponding to camera position 408 (which was the selected position in FIGS. 6-7 example) to a different viewing position corresponding to camera position 406. As discussed earlier when the user wishes to change the viewing position the user simply starts looking at the desired known camera position from where the user wishes to view the content from. In various embodiments the user's head position and/or line of sight is monitored to determine where the user is looking in a displayed simulated environment presented to the user on the rendering and playback system. Based on user's changed head position (based on which line of sight may be determined), it is determined whether the user is looking at an angle (e.g., angle theta shown in the figure) relative to the current camera position 408. If it is determined that the user is looking at a known angle (relative to the current camera position 408) that corresponds to a known camera position, e.g., camera position 406, a visual representation/indication 407 is displayed around the new camera position 406 and optionally a message box such as message box 411 may be displayed. The user may select the new camera position 406 as the current viewing position if the user desires, in a manner similar to what was discussed with regard to FIG. 5.

Figure 9:
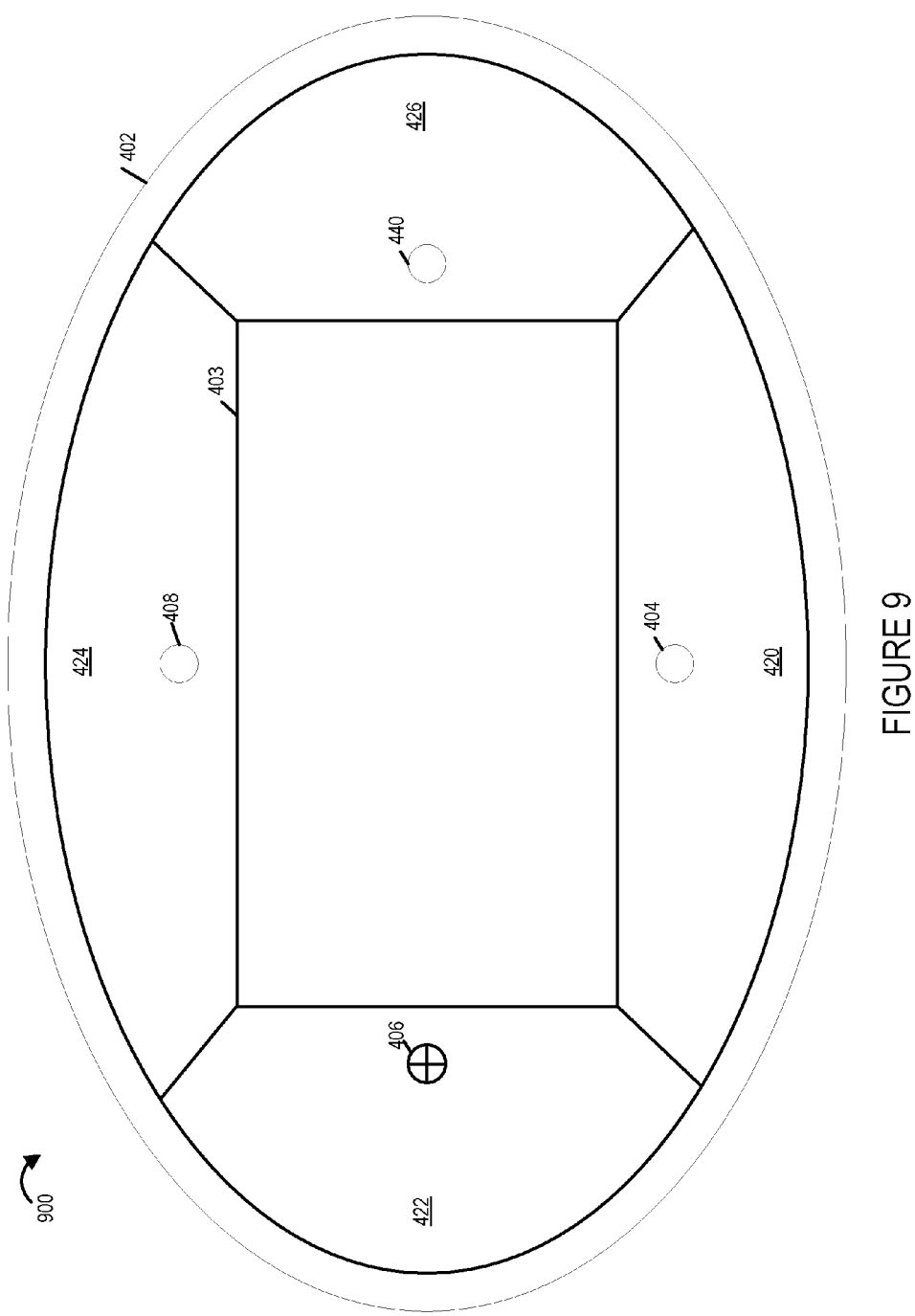
FIG. 9 is a drawing illustrating the exemplary environment at a time following the user selected switch from the second camera position to the new, e.g., third, camera position with the new camera position being shown as the newly selected current viewing position as indicated by the cross in the circle corresponding to the third camera position to which the switch occurred.

FIG. 9 is a drawing 900 illustrating the environment 402 at a time following the user selected switch from the camera position 408 to the new camera position 406 with the new camera position 406 being shown as the newly selected current viewing position as indicated by the cross in the circle corresponding to camera position 406.

Figure 10A:
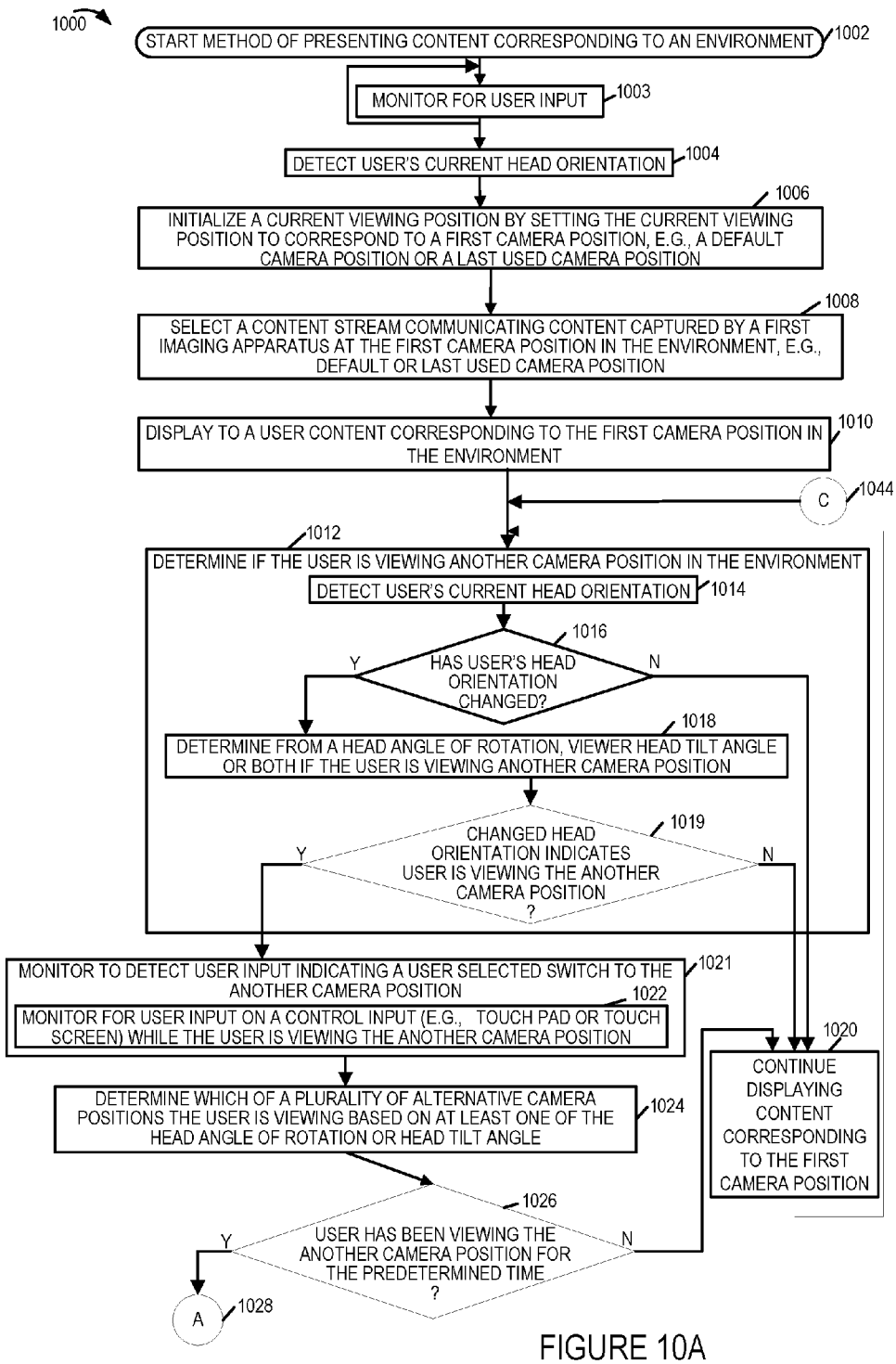
FIG. 10A is a first part of a flowchart illustrating the steps of an exemplary method of presenting content corresponding to an environment in accordance with an exemplary embodiment.

FIG. 10, which comprises a combination of FIGS. 10A and 10B, is a flowchart illustrating the steps of an exemplary method of presenting content corresponding to an environment in accordance with an exemplary embodiment. The exemplary method of flowchart 1000 may be implemented by the rendering and playback systems shown in FIGS. 2, 3 and 12 or any of the other figures. The exemplary method starts in step 1002, with the playback device, e.g., playback system 1200 of FIG. 12 or the playback device of any of the other figures being turned on and initialized. For the purposes of discussion consider that the playback system includes a rendering device coupled to a head mounted display device which includes a display on which the image content is presented. In various embodiments the playback system is aware and/or receives information regarding a plurality of available content streams corresponding to different camera positions. Based on a selected camera position, the playback system can select to receive a corresponding content stream for use in rendering and playback. The information may include information indicating which content streams corresponding to various camera positions are available along with information that can be used to receive the streams such as a multicast group identifier or other identifier that can be used to request the content or tune to the content. Given various available camera positions in the environment from which a user can experience the content, selection of the appropriate stream to receive corresponding to a desired camera position can be important for a satisfying experience.

Operation proceeds from start step 1002 to step 1003. In step 1003 the system starts monitoring for user input, e.g., user input via an interface on the rendering and playback system. In various embodiments the monitoring is performed on an ongoing basis while other operations are being performed in parallel. In some embodiments the system monitors for user control inputs for controlling the rendering and playback system, e.g., control zooming to a displayed area, controlling volume and/or other features. Operation proceeds from step 1003 to step 1004.

In step 1004, during initialization, the user's current head position is detected. The user, aware that the head position detected during the initialization phase will be considered to be a forward looking position, e.g., looking at the performance area 403 of the environment 400, normally maintains his head orientation at a comfortable level during step 1004. In step 1004 the detected current head orientation is set as a default head orientation, e.g., 0 degree head rotation and head tilt angles and with the line of sight being set on the performance area/field 403. Operation proceeds from step 1004 to step 1006. In step 1006 the system initializes a current viewing position by setting the current viewing position to correspond to a first camera position, e.g., a default camera position or a last used camera position. During content display a current viewing position corresponds to a currently selected camera position from where the user will experience the content in the displayed simulated environment. For the purposes of initialization the system may use a known default camera position and/or randomly choose one of the available camera positions and/or use a last (previously) used camera position. For example with reference to FIG. 4 the viewing position corresponding to camera position 404 may be selected as the initial viewing position to initially allow the user to experience content corresponding to camera position 404. Later on if the user desires to view the environment from the perspective of a different camera position he/she can doing in accordance with the features of the invention discussed in more detail below.

Operation proceeds from step 1006 to step 1008. In step 1008 the system, having chosen a camera position during initialization, selects a content stream communicating content captured by a first imaging apparatus (e.g., including one or more cameras) at the first camera position in the environment, e.g., the default or last used camera position for initialization purposes. Operation proceeds from step 1008 to step 1010. In step 1010 the system displays to the user the content corresponding to the first camera position in the environment, e.g., with the user being presented content from the perspective of the first camera position which has been chosen as the default camera position during initialization.

Operation proceeds from step 1010 to step 1012. In step 1012 the system determines if the user is viewing another camera position, e.g., a second camera position different than the current camera position. In some embodiments the another camera position is one of a second, third or fourth camera position in the physical environment, e.g., at a stadium or area. In various embodiments various steps are performed as part of the determining step 1012 in order to determine whether the user is looking at another camera position. As part of step 1012 in some embodiments steps 1014, 1016, 1018, 1019 are performed. In step 1014 once again user's current head orientation is determined, e.g., to check if the head orientation has changed relative to the initially determined head orientation in step 1004. Next in step 1016, based on the detected current head orientation it is determined whether the head orientation has changed relative to the earlier head orientation, e.g., based on a detected head rotation angle and/or head tilt angle. In various embodiments the reference head orientation corresponds to a 0° head angle and changes in the head orientation are determined when the user rotates and/or tilts his/her head relative to the reference 0° position. If in step 1016 it is determined that the head orientation has changed, e.g., due to a detected change in head angle and/or tilt angle from 0°, the operation proceeds from step 1016 to step 1018 otherwise the operation proceeds from step 1016 to step 1020. As part of determining if the user is viewing another camera position in the environment, in step 1018 it is determined if the head orientation indicates (e.g., by the angle relative to the camera position of the current view) whether the user is viewing the another camera position. In some embodiments in step 1018 the system determines from i) a user's head angle of rotation (e.g., rotation between 0° to 360°), ii) head tilt angle or ii) both the user's head angle and head tilt angle, if the user is viewing the another camera position. For example an angle of head rotation or head tilt relative to the default head orientation (reference head orientation) may map to a different known camera position in the environment and indicate that the user is looking at that different camera position. In step 1019, which may be performed as part of step 1018, it is determined if the changed head orientation (detected change in at least one of the angle of head rotation or head tilt) indicates that the user is viewing the different camera position. If the change in one or both of the head rotation angle and head tilt angle does not indicate that the user is viewing the another camera position, operation proceeds to step 1020. In step 1020 the system continues to display content corresponding to the first camera position based on the consideration that since head orientation has not changed the user is not viewing a different camera position in the environment. However if the change in one or both of the head rotation angle and head tilt angle indicates that the user is in fact viewing the another camera position, operation proceeds from step 1019 to step 1021.

In step 1021 the system monitors, while the user is viewing the another camera position, to detect user input indicating a user selected switch to the another camera position. In some embodiments step 1021 includes step 1022 of monitoring for the user input on a control input interface (e.g., a touch pad or touch screen) while the user is viewing the another camera position.

Operation proceeds from step 1021 to step 1024. In step 1024 the system determines which of a plurality of alternative camera positions the user is viewing based on at least one of the head angle of rotation or head tilt angle. Since the number and location of different imaging devices in the environment is known the system can determine which camera position the user is viewing at a given time based on the detected angle of head rotation or head tilt angle relative to the 0° angle corresponding to the reference head orientation. Operation proceeds from step 1024 to step 1026. In step 1026 the rendering and playback system determines if the user has been viewing the another camera position for a predetermined amount of time, e.g., based on how long the user maintains the changed head orientation indicating that the user is maintaining the view of another camera position. If in step 1026 it is determined that the user has not been viewing the another camera position for the predetermined amount of time the operation proceeds from step 1026 to step 1020 and the content corresponding to the first camera position continues to be displayed to the user.

However if in step 1026 it is determined that the user has been viewing the another camera position for the predetermined amount of time the operation proceeds from step 1026 to step 1030 (optional) via connecting node A 1028. In step 1030 the system presents an indication, e.g., in the form of a graphical icon, message box, banner etc., to the user indicating that the user has an option to switch to viewing the environment from a perspective of the another camera position. Thus in some embodiments a visual indication corresponding to the another camera position is presented indicating to the user that a switch to viewing the environment from the perspective of the other camera position is possible. In some embodiments the visual indication is one of at least a change in color or shading at or around the another camera position displayed to the user. In some embodiments the visual indication includes text, e.g., a text/message prompt, in the area of the another camera position putting the user on notice of the potential to switch to viewing from the perspective of said another camera position. Operation proceeds from step 1030 to step 1034.

In step 1034 it is determined if a user input indicating a user selected switch to the another camera position been detected, e.g., on the control input interface corresponding to the rendering and playback system. In some embodiments the system considers a user input indicating a user selected switch to the another camera position valid if the input has been received within a predetermined time from a start time at which the indication was presented to the user. Thus if the user input is received within this predetermined time window it is considered valid in some embodiments. In some embodiments the user input includes a single a double tap on the control input interface while the user is viewing the another camera position. If in step 1034 it is determined that such a user input has not been detected at all or has not been detected within a predetermined time from the time the indication was presented, the operation proceeds from step 1034 to step 1036. In step 1036 the system eliminates the indication presented to the user indicating that the user can switch to viewing the environment from a perspective of the another camera position, e.g., by eliminating a graphical icon or other type of indicator presented on the display. Operation proceeds from step 1036 back to step 1012 via connecting node B 1044.

If in step 1034 it is determined that a user input indicating a user selected switch to the another camera position been detected, e.g., within a predetermined time from the time the indication was presented, the operation proceeds from step 1034 to step 1038. Following the determination that the user input to switch to another camera position has been detected, in step 1038 the system selects a content stream communicating content captured by a second imaging device at the another, e.g., second, camera position in the environment for use in rendering and displaying content from the perspective of the another camera position. Operation proceeds from step 1038 to step 1040. In step 1040 the system switches from displaying to the user content corresponding to the first camera position to displaying content corresponding to the another camera position in the environment. As part of implementing step 1040 in some embodiments step 1042 is performed wherein the system switches from receiving and displaying a first broadcast content stream corresponding to an output of a first stereoscopic camera pair located at the first camera position to receiving and displaying a second broadcast content stream corresponding to an output of a second stereoscopic camera pair (e.g., included in the second imaging apparatus) located at the another camera position. While for discussion purposes reference to first and second broadcast content streams has been made it should be appreciated that the content streams communicating content corresponding to the first camera position and/or the another camera position need not only be broadcast content streams. Rather content streams communicating content may belong to a multicast group and/or may even by unicast content streams streamed to the rendering and playback system upon request. Operation proceeds from step 1040 to back to step 1012 via connecting node B 1044 and the process may continue in the above discussed manner.

Figure 11:
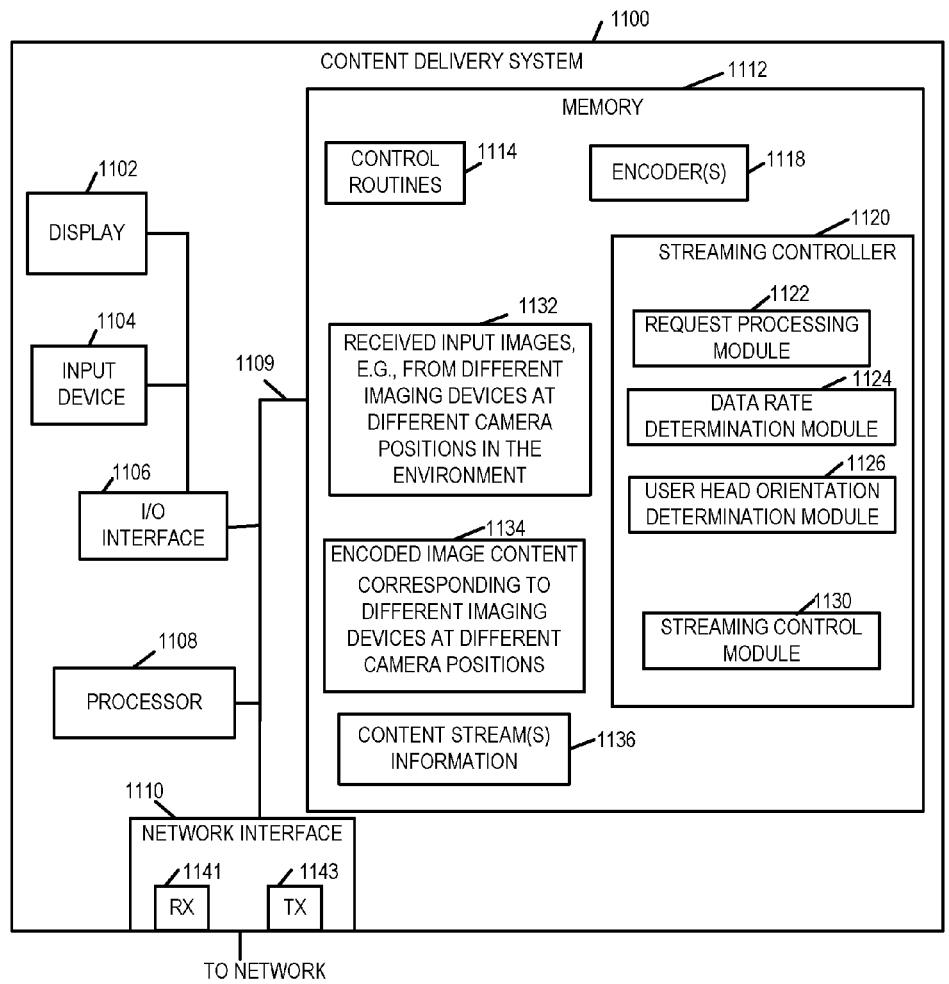
FIG. 11 illustrates an exemplary content delivery system that can be used to encode and stream content in accordance with the features of the invention.

FIG. 11 illustrates an exemplary content delivery system that can be used to encode and stream content in accordance with the features of the invention. The system may be used to perform encoding, storage, and transmission and/or content output in accordance with the features of the invention. The content delivery system 1100 may be used as the system 104 of FIG. 1. While the system shown in FIG. 11 is used for encoding, processing and streaming of content, it should be appreciated that the system 1100 may also include the ability to decode and display the received, processed and/or encoded image data, e.g., to an operator.

The system 1100 includes a display 1102, input device 1104, input/output (I/O) interface 1106, a processor 1108, network interface 1110 and a memory 1112. The various components of the system 1100 are coupled together via bus 1109 which allows for data to be communicated between the components of the system 1100. The system 1100 in some embodiments receives imaging content 1132 captured by the imaging devices at various different camera positions in the environment via the network interface 1110 and/or the I/O interface 1106. In some embodiments the system 1100 processes and encodes the received imaging data 1132 prior to delivering the content, e.g., over communications network 105, to customer rendering and playback systems such as systems 122, 124. Via the display 1102 the system 1100 can display the received, processed and/or encoded image data, e.g., to an operator. Via the input device 1104, which may be a keyboard, touch sensitive screen or another such input interface, an operator can provide input to the system 1100, e.g., to provide one or more input parameters and/or commands. Via the network interface 1110 (which includes a receiver 1141 and transmitter 1143) the system 1100 communicates (receives and/or transmits information) with external devices over the communications network 105. In some embodiments the system 1100 delivers encoded imaging content, acquired from one or more camera devices which captured the imaging content, to customer rendering and playback systems such as systems 122, 124, e.g., over communications network 105.

The memory 1112 includes various modules, e.g., routines, which when executed by the processor 1108 control the computer system 1100 to implement image, e.g., video, acquisition, encoding, storage, and transmission and/or output operations in accordance with the invention. The memory 1112 includes control routines 1114, encoder(s) 1118, a streaming controller 1120, received input images 1132, e.g., stereoscopic or normal video of a scene, encoded image data 1134, and content stream(s) information 1136. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The encoder(s) 1118 may, and in some embodiments do, include a plurality of encoders configured to encode received image content, e.g., a scene and/or one or more scene portions. In some embodiments encoder(s) include multiple encoders with each encoder being configured to encode a scene and/or partitioned scene portions to support a given bit rate stream. The scene may be a stereoscopic scene. Thus in some embodiments each scene portion can be encoded using multiple encoders to support multiple different bit rate streams for each scene. An output of the encoder(s) 1118 is the encoded image content 1134 which are stored in the memory for streaming to customer devices, e.g., rendering and playback devices. The encoded content can be streamed to one or multiple different devices via the network interface 1110.

The streaming controller 1120 is configured to control streaming of encoded content for delivering the encoded image content 1134 to one or more customer devices, e.g., over the communications network 105. The streaming controller 1120 includes a request processing module 1122, a data rate determination module 1124, a user head orientation determination module 1126, and a streaming control module 1130. The request processing module 1122 is configured to process a received request for imaging content from a customer rendering and playback system. The request for content is received in various embodiments via a receiver in the network interface 1110. In some embodiments the request for content includes information indicating the identity of requesting rendering and playback system. In some embodiments the request for content may include data rate supported by the customer playback device, a current head orientation of the user, e.g., orientation of the head mounted display. The request processing module 1122 processes the received request and provides retrieved information to other elements of the streaming controller 1120 to take further actions. While the request for content may include data rate information and current head position information, in various embodiments the data rate supported by the playback device can be determined from network tests and other network information exchange between the system 1100 and the playback and rendering systems. While in some embodiments some customer rendering and playback systems may request content streams based on determined head orientation of the user at the given time, e.g., to allow the user to view the environment from the perspective of a desired camera position in the environment, in many cases the customer rendering and playback systems may not specifically request a content stream but rather simply attach to a broadcast content stream among a plurality of content streams broadcast by the content delivery system 1100. In some embodiments the content delivery system 1100 broadcasts different content streams corresponding to different available camera positions in an environment in accordance with the invention. The content delivery system 1100 provides content stream information 1136 to the customer rendering and playback systems providing information regarding a plurality of content streams that may be available for receiving and use in playback and indicating information needed to tune to the broadcast content streams. The content stream information 1136 also indicates which content stream communicates and corresponds to which camera position in the environment to allow the customer rendering and playback systems to select and receive the appropriate content stream. The customer systems may also use the stream information 1136 to request a particular content stream corresponding to a user selected camera position at a given time in accordance with the invention.

The data rate determination module 1124 is configured to determine the available data rates that can be used to stream imaging content to customer devices, e.g., since multiple encoded scene portions are supported, the content delivery system 1100 can support streaming content at multiple data rates to the customer device. The data rate determination module 1124 is further configured to determine the data rate supported by a playback device requesting content from system 1100. In some embodiments the data rate determination module 1124 is configured to determine available data rate for delivery of image content based on network measurements.

The user head orientation determination module 1126 is configured to determine a current viewing angle and/or a current head orientation of the user, e.g., orientation of the head mounted display, from information received from the customer rendering and playback system. The streaming control module 1130 is configured to control streaming of image content at various supported data rates in some embodiments.

Figure 12:
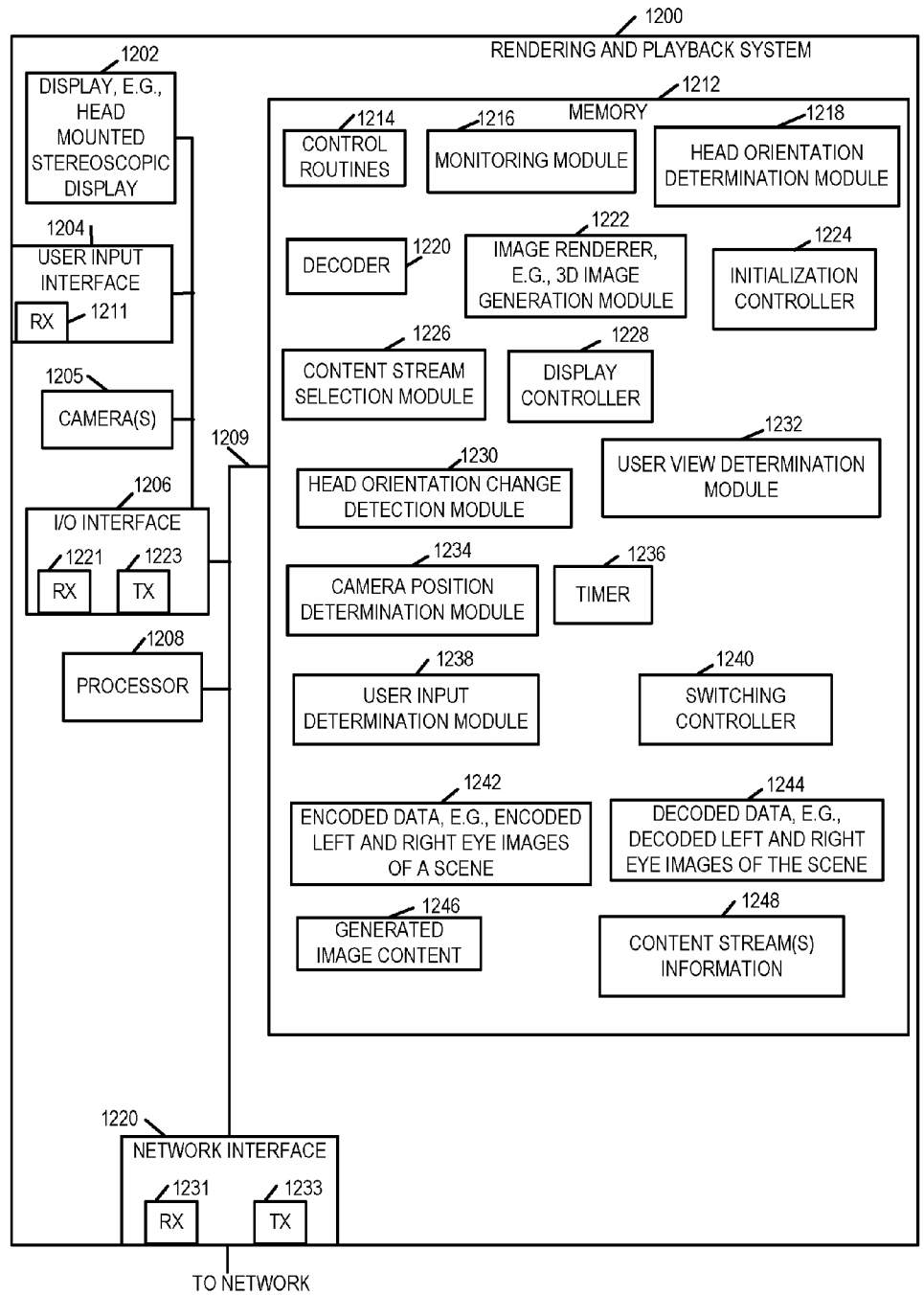
FIG. 12 illustrates an exemplary rendering and playback system that can be used to receive, decode and display the content streamed by the system of FIG. 11.

FIG. 12 illustrates an exemplary rendering and playback system 1200 that can be used to receive, decode and display the content streamed by the content streaming system of FIGS. 1 and 11. The exemplary rendering and playback system 1200 may be used as any of the rendering and playback systems shown in FIGS. 1-3. The rendering and playback system 1200 in some embodiments include and/or coupled to a 3D head mounted display. The system 1200 includes the ability to decode the received encoded image data and generate 3D image content for display to the customer. The rendering and playback system 1200 in some embodiments is located at a customer premise location such as a home or office but may be located at an image capture site as well. The rendering and playback system 1200 can perform signal reception, decoding, viewing position and/or content presentation control, display and/or other operations in accordance with the invention.

The exemplary rendering and playback system 1200 can receive, decode, store and display imaging content, e.g., in a simulated environment, to a user of the system 1200. The exemplary rendering and playback system 1200 may be used as the rendering and playback systems 122, 124, 200 and 300 shown in FIGS. 1-3. The system 1200 includes the ability to decode received encoded image data, e.g., left and right eye images and/or mono (single images) captured by imaging apparatus located at various different camera positions in an environment from where content is being captured and generate image content for display to a user in accordance with the features of the invention.

The rendering and playback system 1200 includes a display 1202, input interface 1204, one or more cameras 1205, input/output (I/O) interface 1206, a processor 1208, network interface 1210 and a memory 1212. The various components of the system 1200 are coupled together via bus 1209 which allows for data to be communicated between the components of the system 1200 and/or by other connections or through a wireless interface. The rendering and playback system 1200 includes the head mounted 3D display 1202 on which the image content is presented, e.g., with left and right eyes of a user being presented with different images in the case of stereoscopic content. By displaying different images to the left and right eyes on a single screen, e.g., on different portions of the single screen to different eyes, a single display can be used to display left and right eye images which will be perceived separately by the viewers left and right eyes. In some embodiments the playback and rendering system 1200 is used as the playback and rendering system 200 and a cell phone/Smartphone screen is used as the display 1202. In some other embodiments the playback and rendering system 1200 is used as the playback and rendering system 300. The head mounted display 1202 maybe implemented using the OCULUS RIFT™ VR (virtual reality) headset which may include the head mounted display 1202. Other head mounted displays may also be used. In a case where a cell phone, e.g., Smartphone, processor is used as the processor 1208 and the cell phone generates and displays images in a head mount assembly (such as head mount 102), the system 1200 may include as part of the head mount device the processor 1208, display 1202, camera(s) 1205 and memory 1212. The processor 1208, display 1202 and memory 1212 may all be part of the cell phone. In other embodiments of the system 1200, the processor 1208 may be part of a gaming system such as an XBOX, PS3, PS4 etc., with the display 1202 being mounted in a head mounting device and coupled to the gaming system. Whether the processor 1208 or memory 1212 are located in the device which is worn on the head or not is not critical and, as can be appreciated, while in some cases it may be convenient to collocate the processor in the headgear, from a power, heat and weight perspective it can be desirable to in at least some cases to have the processor 1208 and memory coupled to the head gear which includes the display. While various embodiments contemplate a head mounted display 1202, the methods and system can also be used with non-head mounted displays which can support 3D image.

The operator/user of the playback and rendering system 1200 may control one or more parameters, input information, commands etc., via the user input interface 1204 and/or select operations to be performed, e.g., select to display simulated environment including scene content. Via the user input interface 1204 a user provides input to the rendering and playback system 1200, e.g., input indicating a user selected switch from a first camera position to another camera position. The user input interface may include, for example, a keyboard, keypad, touchpad and/or touch sensitive screen. The user input interface 1204 includes a receiver 1211 via which the rendering and playback system 1200 receives the information/data provided by the user. The user may use the user input interface 1204 to make a selection of item and/or respond to a displayed prompt and/or other indication requiring user's input. For example user can provide input selecting a different camera position than a currently selected camera position from which the user is viewing the environment. The user input may be provided e.g., by a single tap, double tap or some other action on the input interface 1204.

The camera(s) 1205 includes one or more cameras which can be, and sometimes are, used to capture images, e.g., of persons, physical environment and/or objects in the physical environment where the system 1200 is located. In some embodiments where the system 1200 is used as the rendering and playback 200 the camera 1205 may be the camera device of the Smartphone being used in the system 200. In some embodiments where the system 1200 is used as the rendering and playback system 300 the camera 1205 may be the camera located on the rendering device 302 or on the head mounted display 304.

Via the I/O interface 1206, the system 1200 can be coupled to external devices to exchange signals and/or information with other devices. In some embodiments via the I/O interface 1206 the system 1200 can receive information and/or images captured by external cameras and output information and/or images to external devices. The I/O interface 1206 includes a receiver (RX) 1221 and a transmitter (TX) 1223 via which the receiving and transmitting operations are performed. In some embodiments via the interface 1206 the system 1200 is coupled to an external controller, e.g., such as the handheld controller 306. In embodiments where a handheld controller 306 is available, the handheld controller 306 may be coupled to the I/O interface 1206 and used to enter information and/or provide user input, e.g., selecting a camera position from which the user would like to experience the environment, to the system via the I/O interface 1206.

The processor 1208, e.g., a CPU, executes routines 1214 and uses the various modules to control the system 1200 to operate in accordance with the invention. The processor 1208 is responsible for controlling the overall general operation of the system 1200. In various embodiments the processor 1208 is configured to perform functions that have been discussed as being performed by the playback and rendering system 1200.

Via the network interface 1220 the system 1200 communicates and/or receives signals and/or information (e.g., including images and/or video content corresponding to a scene) to/from various external devices over a communications network, e.g., such as communications network 105. The network interface 1220 includes a receiver 1231 and a transmitter 1233 via which the receiving and transmitting operations are performed. In some embodiments the system receives one or more content streams via the network interface 1220 from the content delivery system 104. In some embodiments the system 1200 receives, via the receiver 1231 of interface 1220, one or more content streams communicating content captured by one or more camera devices located at different camera positions in an environment to use for playback, e.g., stream communicating content corresponding to a scene of an event, e.g., soccer game. The received content stream may be received as encoded data, e.g., encoded scene data 1242.

In some embodiments the memory 1212 includes various routines and/or modules which when executed by the processor 1208 control the rendering and playback system 1200 to perform operations in accordance with the invention. The memory 1212 includes control routines 1214, a monitoring module 1216, a head orientation and/or viewing angle determination module 1218, a decoder 1220, an image renderer 1222, an initialization controller 1224, a content stream selection module 1226, a display controller 1228, a head orientation change detection module 1230, a determination module 1232, a camera position determination module 1234, a timer 1236, user input determination module 1238, and a switching controller 1240. The memory 1212 further includes data/information including encoded data 1242, decoded data 1244 and generated image content 1246.

The control routines 1214 include device control routines and communications routines to control the operation of the system 1200. The monitoring module 1216 is configured to monitor for user input, commands, instructions provided by the user via, e.g., the user input interface 1204 and/or I/O interface 1206. In some embodiments the monitoring module 1216 monitors for user control inputs for controlling the rendering and playback system 1200, e.g., control zooming to a displayed area, controlling volume and/or other features.

The head orientation and/or viewing angle determination module 1218 is configured to determine a current head orientation of the user, e.g., orientation of the head mounted display. The head orientation determination module 1218 may be implemented using one or a combination of sensors to detect user's head orientation at a given time. In some embodiments the determined head orientation and/or change in orientation from a reference orientation is used in determining which of a plurality of camera position the user is viewing at a given time.

The decoder 1220 is configured to decode encoded image content 1242, e.g., encoded content communicated in a content stream received from a content delivery system to produce decoded image data 1244. The decoded image data 1244 may include decoded images captured by imaging devices located at various camera positions in an environment where the images are captures. The image renderer 1222 uses decoded image data including content corresponding to a scene to generate content for displaying to a user on the display 1202. The generated imaging content 1246 which is displayed to a user is the output of the image renderer 1222. The image renderer 1222 may be implemented as a 3D image generation module to render 3D stereoscopic image content.

The initialization module 1224 is configured to set the detected current head orientation as a default/reference head orientation, e.g., 0 degree head rotation and head tilt angles, during the system operation initialization phase. The initialization module 1224 is further configured to initialize a current viewing position by setting the current viewing position to correspond to a first camera position, e.g., a default camera position (predetermined) or a last used camera position. During content display a current viewing position corresponds to a currently selected camera position from where the user will experience the content in the displayed simulated environment.

The content stream selection module 1226 is configured to select a content stream communicating content captured by an imaging device at the selected camera position, e.g., camera position selected by the initialization module 1224 during initialization and/or selected by the user. In various embodiments the content stream selection module 1226 uses the content stream information 1248 to decide which stream(s) to select for use in display. Depending on a camera position selected at a given time the content stream selection module 1226 selects a corresponding content stream accordingly. The display controller 1228 is configured to control displaying of a simulated environment including content corresponding to a user selected camera position in the environment to the user on the display device 1202. The display controller 1228 is configured to control presentation, e.g., display, of content corresponding to the selected camera position in the environment, e.g., on the head mounted display 1202. Thus during initialization the display controller 1228 controls presentation of content corresponding to a first camera position, e.g., default or last used camera position, e.g., with the user being presented content from the perspective of the first camera position which has been chosen as the default camera position during initialization. At another time the display controller 1228 may control presentation of content corresponding to another user selected camera position in the environment.

The head orientation change detection module 1230 is configured to monitor the user's current head orientation to detect changes in the head orientation, e.g., due to rotation of head, tilting of the head or both rotation and tilting, from an initial/current head orientation. In some embodiments the head orientation change detection module 1230 monitors for changes in the head orientation following the initial detection of user's head orientation and setting of the default/reference head orientation. The head orientation change detection module 1230 is configured to detect changes in the head orientation relative to a currently set head orientation at a given time, e.g., default/reference head orientation initially detected by the head orientation determination module 1218. Thus if the user's head orientation changes from the initially detected head orientation, e.g., due to head rotation, tilt or both, the head orientation change detection module 1230 receives an input from the head orientation determination module 1218 indicating a current head orientation and compares it against the currently set/previously detected head orientation of the user stored in memory 1212 to determine if there has been any changes in the head orientation. In some embodiments the head orientation change detection module 1230 is further configured to determine the head angle of rotation and/or head tilt angle relative to the default head orientation, e.g., how much has the user rotated and/or tilted his/her head from the 0° position corresponding to the default/reference head orientation or an angle corresponding to the previously detected head orientation. In various embodiments such head angle of rotation and/or head tilt angle information is used to determine if the user has been viewing another camera position in the environment.

The determination module 1232 is configured to determine if the user is viewing another camera position in the environment at a given time. In some embodiments the determination module 1232 is configured to determine if the user is viewing another camera position in the environment from i) head angle of rotation, ii) head tilt angle or iii) both the user head angle of rotation and user head tilt angle. In various embodiments the determination module 1232 receives the information indicating the changes in head orientation, e.g., head angle of rotation and/or head tilt angle from the head orientation change detection module 1230 and uses this information to make a determination whether the user is viewing another camera position in the environment. In some embodiments the determination module 1232 includes the head orientation change detection module 1230. In various embodiments when it is determined that the user has been viewing the another camera position the monitoring module 1216 monitors for monitors, while the user of the system 1200 is viewing the another camera position in the environment, to detect user input indicating a user selected switch to the another camera position. In some embodiments the monitoring module 1216 monitors for user input on a control input interface (e.g., such as the user interface 1204) while the user is viewing the another camera position.

The camera position determination module 1234 is configured to determine which of a plurality of alternative camera positions the user is viewing based on at least one of the user head angle of rotation or the head tilt angle. The timer 1236 is configured to determine if the user has been viewing the another camera position for a predetermined time. In some embodiments the timer 1234 monitors the time elapsed since the user has been determined to be viewing the other camera position and detect if the elapsed time equals or exceeds the predetermined time. In various embodiments when it is determined that the user has not been viewing the another camera position or was viewing the another camera position for less than the predetermined time, the display controller 1228 is configured to control the system to continue displaying, e.g., on the display 1202, content corresponding to the first camera position. In various embodiments when it is determined that the user has been viewing the another camera position for the predetermined time, the display controller 1228 is configured to control the system 1200 to present, e.g., display along with the content being presented, the user an indication that the user can switch to viewing the environment from a perspective of the another camera position. In some embodiments the display controller 1228 is configured, as part of presenting the user an indication that the user can switch to viewing the environment from a perspective of the another camera position, to provide a visual indication corresponding to the another camera position indicating that a switch to viewing the environment from the perspective of the another camera position is possible. In some embodiments the visual indication is one of at least a change in color or shading at said another camera position. In some embodiments the visual indication includes text in the area of said another camera position putting the user on notice of the potential to switch to viewing from the perspective of said another camera position.

The user input determination and processing module 1238 is configured to determine if the user input indicating a user selected switch to the another camera position has been detected, e.g., on the user input interface 1204 or other interface, within a predetermined time of the start of presenting the indication to the user, e.g., visual indication. The user input determination and processing module 1238, upon determining that a user input has been detected at a user interface, processes the user input information and/or commands/instructions and take action accordingly and/or provide the received input to another system element for further processing, action or storage in the memory 1212. In some embodiments when it is determined that the user input indicating a user selected switch to the another camera position has not been detected within the predetermined time from the start of presenting the indication the user input determination and processing module 1238 provides an instruction to the display controller 1228 to eliminate, e.g., exclude from being displayed, the indication that the user can switch to the another camera position. Accordingly the display controller 1228 controls the system 1200 to eliminate the indication indicating that the user can switch to the another camera position.

In various embodiments when it is determined that the user input indicating a user selected switch to the another camera position has been detected within the predetermined time the user input determination and processing module 1238 provides an instruction to the stream selection module 1226 to select a content stream corresponding to the another camera position. Thus when it is determined that the user input indicating a user selected switch to the another camera position has been detected within the predetermined time the stream selection module 1226 is configured to select a content stream communicating content captured by an imaging device located at the another, e.g., second, camera position in the environment.

The switching controller 1240 is configured to control the system 1200 to switch from displaying to the user content corresponding to the first camera position in the environment to displaying content corresponding to the another camera position in the environment when it is determined that the user input indicating a user selected switch to the another camera position has been detected within the predetermined time. In some such embodiments switching controller 1240 is configured to control the system to switch from receiving and displaying a first broadcast content stream corresponding to an output of a first imaging device, e.g., a first stereoscopic camera pair, located at the first camera position to receiving and displaying a second broadcast content stream corresponding to an output of a second imaging device, e.g., a second stereoscopic camera pair, located at said another camera position.

The content stream information 1248 includes information regarding a plurality of content streams that may be available for receiving and use in playback. In some embodiments the stream information 1248 is provided by the content provider's content delivery system 1100 (e.g., stream information 1136). In some embodiments the different available content streams correspond to different imaging devices located at different camera positions in the environment. In some embodiments the stream information 1248 includes, for a plurality of available content streams, one of a multicast address of a multicast group which can be joined to receive a given content stream corresponding to a given camera position, information which can be used to request access to a switched digital video channel used to provide a given content stream corresponding to a given camera position, or channel tuning information which can be used to control a tuner of the playback system 1200 to tune to a broadcast channel on which a given content stream corresponding to a given camera position is broadcast.

In some embodiments the modules and/or elements shown in the memory 1212 are implemented as software modules. In other embodiments the elements, while shown to be included in the memory 1212, are implemented in hardware, e.g., as individual circuits with each element being implemented as a circuit for performing the function corresponding to the element. In still other embodiments the modules and/or elements are implemented using a combination of software and hardware.

While shown in FIG. 12 example to be included in the memory 1212, the elements shown included in the system 1200 can, and in some embodiments are, implemented fully in hardware within the processor 1208, e.g., as individual circuits. In other embodiments some of the elements are implemented, e.g., as circuits, within the processor 1208 with other elements being implemented, e.g., as circuits, external to and coupled to the processor 1208. As should be appreciated the level of integration of modules on the processor and/or with some modules being external to the processor may be one of design choice. Alternatively, rather than being implemented as circuits, all or some of the elements may be implemented in software and stored in the memory 1212 of the system 1200, with the software modules controlling operation of the system 1200 to implement the functions corresponding to the modules when the modules are executed by a processor, e.g., processor 1208. In still other embodiments, various elements are implemented as a combination of hardware and software, e.g., with a circuit external to the processor 1108 providing input to the processor 1208 which then under software control operates to perform a portion of a module's function.

While shown in the FIG. 12 embodiment as a single processor, e.g., computer, it should be appreciated that the processor 1208 may be implemented as one or more processors, e.g., computers. When one or more elements in the memory 1212 are implemented as software modules, the modules include code, which when executed by the processor 1208, configure the processor 1208 to implement the function corresponding to the module. In embodiments where the various modules shown in FIG. 12 are stored in the memory 1212, the memory 1212 is a computer program product comprising a computer readable medium comprising code, e.g., individual code for each module, for causing at least one computer, e.g., processor 1208, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIGS. 11 and 12 control and/or configure the systems 1100 and 1200 or elements therein respectively such as the processor 1108 and 1208 to perform the functions of corresponding steps of the methods of the present invention, e.g., such as those illustrated and/or described in the flowchart 1000.

An exemplary method of presenting content corresponding to an environment, in accordance with some embodiments comprises: displaying to a user content corresponding to a first camera position in said environment; determining if the user is viewing another camera position in said environment; and monitoring, while said user is viewing said another camera position, to detect user input indicating a user selected switch to said another camera position. In some embodiments the determining if the user is viewing another camera position in said environment includes determining from i) a user head angle of rotation, ii) user head tilt angle or iii) both the user head angle of rotation and user head tilt angle, if said user is viewing said another camera position.

In some embodiments the method further comprises: determining which of a plurality of alternative camera positions the user is viewing based on at least one of the user head angle of rotation or viewer head tilt angle. In some embodiments the method further comprises: when it is determined that the user is viewing another camera position in said environment, presenting the user an indication that the user can switch to viewing the environment from a perspective of said another camera position.

In some embodiments the presenting the user an indication that the user can switch to viewing the environment from a perspective of said another camera position includes providing a visual indication corresponding to the another camera position that a switch to viewing the environment from the perspective of said another camera position is possible. In some embodiments the visual indication is one of at least a change in color or shading at the another camera position. In some embodiments the visual indication includes text in the area of said another camera position putting the user on notice of the potential to switch to viewing from the perspective of said another camera position. In some embodiments the another camera position is one of a second, third or fourth camera position at a stadium. In some embodiments the environment is a stadium or area. In some embodiments the environment includes an audience seating area and a performance area said environment including at least two camera positions corresponding to different audience seating positions. In some embodiments the performance area is one of a field or a stage.

In some embodiments the method further comprises: in response to said monitoring detecting user input indicating a user selected switch to said another camera position switching from displaying to the user content corresponding to a first camera position in said environment to displaying to the user content corresponding to the another camera position in said environment.

In some embodiments switching from displaying to the user content corresponding to a first camera position in said environment includes switching from receiving and displaying a first broadcast content stream corresponding to an output of a first stereoscopic camera pair located at said first camera position to receiving and displaying a second broadcast content stream corresponding to an output of a second stereoscopic camera pair located at said another camera position.

In some embodiments the monitoring to detect user input indicating a user selected switch to said another camera position includes monitoring for user input on a control input interface (e.g., touch pad or touch screen) while said user is viewing said another camera position. In some embodiments the user input includes one or a double tap on the control input while the user is viewing the another camera position. In some embodiments determining if the user is viewing another camera position in said environment includes: monitoring a current head orientation of the user; and determining if the head orientation indicates (e.g., by the angle relative to the camera position of the current view) whether the user is viewing the another camera position.

In some embodiments the method further comprises: determining, prior to presenting the user an indication that the user can switch to viewing the environment from a perspective of said another camera position, if the user was viewing said another camera position for a predetermined time. In some embodiments presenting the user said indication is contingent on determining that the user was viewing said another camera position for the predetermined time.

In some embodiments the method further comprises: eliminating the indication that the user can switch to viewing the environment from a perspective of said another camera position if said monitoring, while said user is viewing said another camera position, fails to detect user input indicating a user selected switch to said another camera position within a predetermined time of the start of presenting the user the indication.

An exemplary interactive system, e.g., such as the rendering and playback system 1200, for presenting content corresponding to an environment, comprises: a display device; a display controller configured to control displaying, to a user on said display device, of content corresponding to a first camera position in said environment; a user view determination module configured to determine if the user is viewing another camera position in said environment; and a monitoring module configured to monitor, while said user is viewing said another camera position, to detect user input indicating a user selected switch to said another camera position.

In some embodiments the user view determination module is configured to determine from i) a user head angle of rotation, ii) user head tilt angle or iii) both the user head angle of rotation and user head tilt angle, if said user is viewing said another camera position. In some embodiments the system further comprises: a camera position determination module configured to determine which of a plurality of alternative camera positions the user is viewing based on at least one of said user head angle of rotation or user head tilt angle.

In some embodiments the system the display controller is further configured to control presenting, on said display device, of an indication to the user that the user can switch to viewing the environment from a perspective of said another camera position when it is determined that the user is viewing another camera position in said environment. In some embodiments the display controller is further configured to control presenting of a visual indication corresponding to the another camera position, on said display device, indicating that a switch to viewing the environment from the perspective of said another camera position is possible, as part of being configured to present the user an indication that the user can switch to viewing the environment from a perspective of said another camera position.

In some embodiments the system further comprises: a switch controller configured to control the system to switch from displaying, on said display device, content corresponding to a first camera position in said environment to displaying to the user content corresponding to the another camera position in said environment, in response to said monitoring module detecting user input indicating a user selected switch to said another camera position. In some embodiments the switch controller is further configured, as part of being configured to switch from displaying content corresponding to a first camera position to displaying content corresponding to said another camera position, to control the system to switch from receiving and displaying a first broadcast content stream corresponding to an output of a first stereoscopic camera pair located at said first camera position to receiving and displaying a second broadcast content stream corresponding to an output of a second stereoscopic camera pair located at said another camera position.

In some embodiments the system further comprises: a control input interface. In some embodiments the monitoring module is configured to monitor to detect user input indicating a user selected switch to said another camera position on said control input interface while said user is viewing said another camera position.

In some embodiments the user view determination module is further configured to: monitor the current head orientation of the user; and determine if the head orientation indicates whether the user is viewing the another camera position. In some embodiments the system further comprises: a timer configured to determine if the user was viewing said another camera position for a predetermined time. In some embodiments the display controller is configured to control presenting, on said display device, of said indication to the user that the user can switch to viewing the environment from a perspective of said another camera position contingent upon a determination by said timer that the user was viewing said another camera position for the predetermined time. In some embodiments the display controller is configured to eliminate the indication that the user can switch to viewing the environment from a perspective of said another camera position if said monitoring module fails to detect user input indicating a user selected switch to said another camera position within a predetermined time of the start of presenting the user the indication.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of presenting content corresponding to an environment, the method comprising:
    displaying to a user content corresponding to a first camera position in said environment;
    determining if the user is viewing another camera position in said environment, wherein determining if the user is viewing another camera position in said environment includes determining from i) a user head angle of rotation, ii) user head tilt angle or iii) both the user head angle of rotation and user head tilt angle, if said user is viewing said another camera position; and
    monitoring, while said user is viewing said another camera position, to detect user input indicating a user selected switch to said another camera position.

2. The method of claim 1, further comprising:
    determining which of a plurality of alternative camera positions the user is viewing based on at least one of said user head angle of rotation or user head tilt angle.

3. The method of claim 1, further comprising:
    when it is determined that the user is viewing another camera position in said environment, presenting the user an indication that the user can switch to viewing the environment from a perspective of said another camera position.

4. The method of claim 3, wherein presenting the user an indication that the user can switch to viewing the environment from a perspective of said another camera position includes providing a visual indication corresponding to the another camera position that a switch to viewing the environment from the perspective of said another camera position is possible.

5. The method of claim 1, wherein said environment includes an audience seating area and a performance area, said environment including at least two camera positions corresponding to different audience seating positions.

6. The method of claim 1, further comprising:
in response to said monitoring detecting user input indicating a user selected switch to said another camera position, switching from displaying to the user content corresponding to a first camera position in said environment to displaying to the user content corresponding to the another camera position in said environment.

7. The method of claim 1, wherein monitoring to detect user input indicating a user selected switch to said another camera position includes monitoring for user input on a control input interface while said user is viewing said another camera position.

8. The method of claim 7, wherein determining if the user is viewing another camera position in said environment includes:
monitoring a current head orientation of the user; and
determining if the head orientation indicates whether the user is viewing the another camera position.

9. The method of claim 8, further comprising:
determining, prior to presenting the user an indication that the user can switch to viewing the environment from a perspective of said another camera position, if the user was viewing said another camera position for a predetermined time; and
wherein said presenting the user said indication is contingent on determining that the user was viewing said another camera position for the predetermined time.

10. The method of claim 1, wherein said monitoring, while said user is viewing said another camera position, to detect user input indicating a user selected switch to said another camera position includes:
monitoring for a user touch input indicating a user selected switch to said another camera position.

11. The method of claim 1, further comprising:
making a decision as to what action to take in response to detecting that a user is viewing another camera position in the environment based on an amount of time the user has been viewing the another camera position.

12. A method of presenting content corresponding to an environment, the method comprising:
displaying to a user content corresponding to a first camera position in said environment;
determining if the user is viewing another camera position in said environment;
when it is determined that the user is viewing another camera position in said environment, presenting the user an indication that the user can switch to viewing the environment from a perspective of said another camera position, wherein presenting the user an indication that the user can switch to viewing the environment from a perspective of said another camera position includes providing a visual indication corresponding to the another camera position that a switch to viewing the environment from the perspective of said another camera position is possible, wherein said visual indication is one of at least a change in color or shading at the another camera position; and monitoring, while said user is viewing said another camera position, to detect user input indicating a user selected switch to said another camera position.

13. A method of presenting content corresponding to an environment, the method comprising:
displaying to a user content corresponding to a first camera position in said environment;
determining if the user is viewing another camera position in said environment;
when it is determined that the user is viewing another camera position in said environment, presenting the user an indication that the user can switch to viewing the environment from a perspective of said another camera position, wherein presenting the user an indication that the user can switch to viewing the environment from a perspective of said another camera position includes providing a visual indication corresponding to the another camera position that a switch to viewing the environment from the perspective of said another camera position is possible, wherein said visual indication includes text in the area of said another camera position putting the user on notice of the potential to switch to viewing from the perspective of said another camera position; and
monitoring, while said user is viewing said another camera position, to detect user input indicating a user selected switch to said another camera position.

14. A method of presenting content corresponding to an environment, the method comprising:
displaying to a user content corresponding to a first camera position in said environment;
determining if the user is viewing another camera position in said environment; and
monitoring, while said user is viewing said another camera position, to detect user input indicating a user selected switch to said another camera position; and
in response to said monitoring detecting user input indicating a user selected switch to said another camera position, switching from displaying to the user content corresponding to a first camera position in said environment to displaying to the user content corresponding to the another camera position in said environment, wherein switching from displaying to the user content corresponding to a first camera position in said environment to displaying to the user content corresponding to the another camera position in said environment includes switching from receiving and displaying a first broadcast content stream corresponding to an output of a first stereoscopic camera pair located at said first camera position to receiving and displaying a second broadcast content stream corresponding to an output of a second stereoscopic camera pair located at said another camera position.

15. A method of presenting content corresponding to an environment, the method comprising:
displaying to a user content corresponding to a first camera position in said environment;
determining if the user is viewing another camera position in said environment; and
monitoring, while said user is viewing said another camera position, to detect user input indicating a user selected switch to said another camera position, wherein monitoring to detect user input indicating a user selected switch to said another camera position includes monitoring for user input on a control input interface while said user is viewing said another camera position; and if said monitoring, while said user is viewing said another camera position, to detect user input indicating a user selected switch to said another camera position fails to detect said user input indicating a user selected switch within a predetermined time of the start of presenting the user the indication, eliminating the indication that the user can switch to viewing the environment from a perspective of said another camera position.

16. An interactive system for presenting content corresponding to an environment, comprising:
   a display device;
   a display controller configured to control displaying, to a user on said display device, of content corresponding to a first camera position in said environment;
   a user view determination module configured to determine if the user is viewing another camera position in said environment, wherein said user view determination module is configured to determine from i) a user head angle of rotation, ii) user head tilt angle or iii) both the user head angle of rotation and user head tilt angle, if said user is viewing said another camera position; and
   a monitoring module configured to monitor, while said user is viewing said another camera position, to detect user input indicating a user selected switch to said another camera position.

17. The interactive system of claim 16, further comprising:
   a camera position determination module configured to determine which of a plurality of alternative camera positions the user is viewing based on at least one of said user head angle of rotation or user head tilt angle.

18. The interactive system of claim 16, wherein said display controller is further configured to control presenting, on said display device, of an indication to the user that the user can switch to viewing the environment from a perspective of said another camera position when it is determined that the user is viewing another camera position in said environment.

19. The interactive system of claim 16, further comprising:
   a switch controller configured to control the system to switch from displaying, on said display device, content corresponding to a first camera position in said environment to displaying to the user content corresponding to the another camera position in said environment, in response to said monitoring module detecting user input indicating a user selected switch to said another camera position.

20. The interactive system of claim 16, wherein said monitoring module is configured to monitor a sensor for one or more user taps indicating a user selected switch to said another camera position.

21. A non-transitory machine readable medium comprising processor executable instructions, which when executed by a processor, control a system to:
   display to a user, on a display, content corresponding to a first camera position in an environment;
   determine if the user is viewing another camera position in said environment, wherein determining if the user is viewing another camera position in said environment includes determining from i) a user head angle of rotation, ii) user head tilt angle or iii) both the user head angle of rotation and user head tilt angle, if said user is viewing said another camera position; and
   monitor, while said user is viewing said another camera position, to detect user input indicating a user selected switch to said another camera position.

* * * * *